(12) United States Patent
Tomezak

(10) Patent No.: US 8,306,153 B2
(45) Date of Patent: Nov. 6, 2012

(54) METHOD AND SYSTEM FOR TRACKING PHASE IN A RECEIVER FOR 8VSB

(75) Inventor: Gregory J. Tomezak, Buffalo Grove, IL (US)

(73) Assignee: Techwell LLC, Milpitas, CA (US)

( * ) Notice: Subject to any disclaimer, the term of this patent is extended or adjusted under 35 U.S.C. 154(b) by 462 days.

(21) Appl. No.: 12/563,822

(22) Filed: Sep. 21, 2009

(65) Prior Publication Data

US 2011/0069788 A1    Mar. 24, 2011

(51) Int. Cl.
H04L 27/00 (2006.01)

(52) U.S. Cl. .................................................. 375/316

(58) Field of Classification Search .................. 375/316, 375/260, 232, 326, 329, 341
See application file for complete search history.

(56) References Cited

U.S. PATENT DOCUMENTS

| | | | |
|---|---|---|---|
| 5,406,587 A | 4/1995 | Horwitz et al. | |
| 5,471,508 A | 11/1995 | Koslov | |
| 5,506,636 A | 4/1996 | Patel et al. | |
| 5,673,293 A | 9/1997 | Scarpa et al. | |
| 5,731,848 A | 3/1998 | Patel et al. | |
| 5,796,786 A | 8/1998 | Lee | |
| 5,933,460 A | 8/1999 | Lee | |
| 6,115,431 A | 9/2000 | Lee | |
| 6,665,355 B1 | 12/2003 | Chen et al. | |
| 6,757,336 B1 | 6/2004 | Elgart et al. | |
| 6,967,690 B2 | 11/2005 | Choi et al. | |
| 6,983,028 B2 | 1/2006 | Ahn | |
| 7,149,260 B2 | 12/2006 | Kim et al. | |
| 7,272,197 B2 | 9/2007 | Hwang | |
| 7,312,642 B1 | 12/2007 | Li et al. | |
| 7,327,819 B2 | 2/2008 | Lin et al. | |
| 7,362,802 B2 | 4/2008 | Saed | |
| 7,403,579 B2 | 7/2008 | Jaffe et al. | |
| 7,480,350 B2 | 1/2009 | Kim et al. | |

(Continued)

FOREIGN PATENT DOCUMENTS

WO     2004/107644     12/2004

OTHER PUBLICATIONS

ATSC, "A/53: ATSC Digital Television Standard, Parts 1-6, 2007", Advanced Television Systems Committee, Inc., Washington, D.C., available online at: <http://www.atsc.org/standards/a53/a_53-Part-1-6-2007.pdf>, 136 pages, Jan. 3, 2007.

(Continued)

Primary Examiner — Khai Tran
(74) Attorney, Agent, or Firm — Fogg & Powers LLC

(57) ABSTRACT

Embodiments of the invention relate to systems and methods for tracking phase in a receiver which uses multiple phase tracking techniques. A phase tracking module generates a plurality of symbol decisions related to received 8-level-vestigial-sideband ("8VSB") signals, determines a phase tracking threshold value based on a mean square error, receives an estimated imaginary component of a transmitted signal based on the symbol decisions, and determines a phase estimate based on the imaginary component of the transmitted signal and the plurality of symbol decisions. The phase tracking module selects one of a first phase tracking technique and a second phase tracking technique based on the phase estimate. The first phase tracking technique is selected when the phase estimate is greater than the phase tracking threshold value, and the second phase tracking technique is selected when the phase estimate is less than the phase tracking threshold value.

28 Claims, 18 Drawing Sheets

U.S. PATENT DOCUMENTS

| | | | |
|---|---|---|---|
| 7,616,685 | B2 | 11/2009 | Fimoff et al. |
| 7,961,795 | B2 * | 6/2011 | Fei et al. ............ 375/260 |
| 2004/0114701 | A1 | 6/2004 | Markman |
| 2007/0092049 | A1 | 4/2007 | Yu et al. |
| 2008/0175308 | A1 | 7/2008 | Fimoff et al. |
| 2008/0240295 | A1 | 10/2008 | Kim |
| 2009/0003493 | A1 | 1/2009 | Gunturi et al. |
| 2009/0245427 | A1 * | 10/2009 | Alagha et al. ............ 375/329 |

OTHER PUBLICATIONS

ATSC, ATSC Recommended Practice: Receiver Performance Guidelines (with Corrigendum No. 1 and Amendment No. 1), Doc. A/74, Advanced Television Systems Committee, Washington, D.C., available online at: <http://www.atsc.org/standards/a_74-w-Corr-1-Amend-1.pdf>, 69 pages, Jun. 18, 2004, Corrigendum No. 1 dated Jul. 11, 2007, Amendment No. 1 dated Nov. 29, 2007.

Lee, W., et al., "A Hardware Efficient Phase/Gain Tracking Loop for the Grand Alliance VSB HDTV Receiver", IEEE Transactions on Consumer Electronics, vol. 42, No. 3, pp. 632-639, Aug. 1996.

Mengali, U., et al., "Synchronization Techniques for Digital Receivers", Plenum Press, New York, NY, first edition, Chapter 3—Carrier Frequency Recovery with Linear Modulations, pp. 124-126, 1997.

Mengali, U., et al., "Synchronization Techniques for Digital Receivers", Plenum Press, New York, NY, first edition, Chapter 5—Carrier Phase Recovery with Linear Modulations, pp. 201-207, 1997.

* cited by examiner

METHOD AND SYSTEM FOR TRACKING PHASE IN A RECEIVER FOR 8VSB

BACKGROUND

The present invention relates to tracking phase in a vestigial sideband ("VSB") receiver. The ATSC digital television ("DTV") terrestrial transmission standard was adopted in 1996. Since then, several generations of receivers have been developed, which attempt to improve the reception performance of a previous generation of receivers.

In an ATSC DTV transmission system, data is transmitted in frames 10 as shown in FIG. 1. Each frame includes 2 fields 15 and 20; each field includes 313 segments; and each segment includes 832 symbols for a total of 260,416 symbols per field. The first four symbols in each segment are segment sync symbols 25 having the sequence [+5, −5, −5, +5].

The first segment in each field is a field sync segment 30 as shown in FIG. 2. The field sync segment 30 includes a segment sync 35, a 511 symbol pseudo noise ("PN511") sequence 40, a 63 symbol pseudo noise ("PN63") sequence 45, a second PN63 sequence 50, and a third PN63 sequence 55, which are followed by 24 symbols 60 indicating that the transmission mode is 8VSB. In alternating fields, the three PN63 sequences are the same. In the remaining fields, the first and third PN63 sequences are the same, while the second PN63 sequence is inverted. In either case, the first 728 symbols of the segment are a priori known to the receiver and may be used for equalizer training. Following the first 728 symbols are 92 symbols 65 including mode and reserved fields. All of the symbols are from the set {+5 −5}. The last 12 symbols 70 of this segment are precode symbols and are from the set {−7 −5 −3 −1 +1 +3 +5+7} and are duplicates of the last 12 symbols of the previous data field.

The subsequent 312 segments of the field are referred to as data segments 75 and include 828 trellis encoded symbols 80 following the four segment sync symbols 35, as shown in FIG. 3. The trellis encoded symbols 80 are encoded by, for example, a 12-phase trellis encoder, which results in 8 level symbols from the set {−7 −5 −3 −1 +1 +3 +5 +7}.

FIG. 4 illustrates a VSB transmitter 100. In the transmitter 100, data is randomized in a randomizer 105, Reed-Solomon byte wise encoded in a Reed-Solomon encoder 110, and then byte interleaved in an interleaver 115. The data is trellis encoded by a 12-phase trellis encoder 120. A frame formatter 125 adds the segment sync symbols and the field sync symbols to the trellis encoded data at the appropriate times to create the data frame structure of FIG. 1. A pilot carrier module 130 then adds a fixed DC level to each symbol.

A modulator 135 incorporates root raised cosine pulse shaping (described below) and modulates the signal for RF transmission as an 8VSB signal with a symbol rate of 10.76 MHz. The 8VSB signal differs from commonly used linear modulation methods such as quadrature-amplitude modulation ("QAM") in that the 8VSB symbols are real, but have a pulse shape that is complex, with only the real part of the pulse having a Nyquist shape.

FIG. 5 is a diagram of an 8VSB receiver 200. A tuner 205 and demodulator 210 demodulate the RF signal to baseband before timing and synchronization recovery in a sync and timing recovery module 215. The data is then match filtered in a matched filter 220, equalized in an equalizer 225, and sent through a phase tracking module 230, trellis decoder 235, de-interleaver 240, Reed-Solomon decoder 245, and de-randomizer 250. During the process of down converting a VSB signal, the tuner 205 adds phase noise to the signal, which affects the input to the matched filter 220. In a well-designed frequency and phase locked loop ("FPLL") carrier recovery system, the receiver 200 is able to lock on to the incoming frequency in addition to removing much of the phase noise introduced by the tuner 205. However, the phase noise which is outside of the bandwidth of the FPLL passes through to the remaining components in the VSB receiver 200.

The channel between the transmitter 100 and receiver 200 is viewed in its baseband equivalent form to accurately describe the signal at the input to the phase tracker 230. The baseband signal model assumes that the carrier frequency and symbol clock frequency were recovered in the sync and timing recovery module 215. The transmitted signal has a root raised cosine spectrum with a nominal bandwidth of 5.38 MHz and an excess bandwidth of 11.5% centered at one fourth of the symbol rate (i.e., 2.69 MHz). Thus, the transmitted pulse shape q(t) is complex and is given by EQN. 1.

$$q(t)=e^{j\pi F_s t/2} q_{RRC}(t) \qquad \text{EQN. 1}$$

where $F_s$ is the symbol frequency, and $q_{RRC}(t)$ is a real square root raised cosine pulse with an excess bandwidth of 11.5% of the channel. The pulse q(t) is referred to as the "complex root raised cosine pulse." For the 8VSB system, the transmitter pulse shape q(t) and the receiver matched filter pulse shape q*(−t) are identical since q(t) is conjugate-symmetric. Thus, the raised cosine pulse p(t), referred to as the "complex raised cosine pulse," is given by EQN. 2.

$$p(t)=q(t)*q^*(-t) \qquad \text{EQN. 2}$$

where * denotes convolution, and * denotes complex conjugation.

The transmitted baseband signal of data rate 1/T symbols/sec is represented as EQN. 3.

$$z(t) = \sum_n s(n)q(t-nT) \qquad \text{EQN. 3}$$

where $\{s(n) \in A \equiv \{a_1, \ldots, a_8\} \subset R^1\}$ is the transmitted data sequence, which is a discrete 8-ary sequence taking values on the real 8-ary alphabet A. The physical channel between the transmitter 100 and receiver 200 is denoted as c(t) and is mathematically modeled using EQN. 4.

$$c(t) = \sum_{n=-L_{ha}}^{L_{hc}} \beta_n \delta(t-\tau_n) \qquad \text{EQN. 4}$$

where $\{\beta_n\} \subset C^1$, $L_{ha}$ and $L_{hc}$ are the maximum number of anti-causal and causal multipath components, respectively, $\tau_n$ is multipath delay, and δ(t) is the Dirac delta function.

Because the matched filter 220 is a relatively short duration filter, the phase noise, θ(t), is assumed to be approximately constant for the entire filter. Therefore, the matched filter output sampled at the symbol rate can be approximated with the expression in EQN. 5, $$r_{mf}(k) \approx e^{j\theta(k)} \sum_n s(n)h(k-n) + n(k) \qquad \text{EQN. 5}$$

where the overall channel impulse response is given by $$h(k) = p(t) * c(t)|_{t=kT} = \sum_{n=-L_{ha}}^{L_{hc}} \beta_n p(t - \tau_n)|_{t=kT} \qquad \text{EQN. 6}$$

and the complex noise term after the matched filter is given by $$n(k) = (\eta(t)e^{i\theta(t)}) * q^*(-t)|_{t=kT} \qquad \text{EQN. 7}$$

with $\eta(t)$ being a zero-mean white Gaussian noise process with spectral density $\sigma_n^2$ for each real and imaginary part.

The real part of the matched filter output is then input into the real equalizer 225. The phase noise is assumed to be relatively constant over the duration of the equalizer impulse response (i.e. $\theta(k-n) \approx \theta(k) \forall |n| < M$, where $2M+1$ is the length of the equalizer filter, $g_{EQ}(k)$), and the equalizer 225 is assumed to effectively remove the intersymbol interference ("ISI") from the channel, which results in $$\text{Re}\{c(k)*p(k)*g_{eq}(k)\} = \delta(k) \qquad \text{EQN. 8}$$

Therefore, the equalizer output, $x_R(k)$, can be expressed as $$x_R(k) = \text{Re}\{e^{i\theta(k)}(s(k) + iH'\{s(k)\})\} + n'_R(k) \qquad \text{EQN. 9}$$
$$= \cos(\theta(k))s(k) - \sin(\theta(k))v(k) + n'_R(k)$$

where $$v(k) = H'\{s(k)\} \text{ and} \qquad \text{EQN. 10}$$

$$n'_R(k) = \text{Re}\{n(k)\} * g_{eq}(k) \qquad \text{EQN. 11}$$

H' { } is herein referred to as the pseudo-Hilbert transform and is the imaginary portion of the raised cosine pulse defined in EQN. 2. Therefore, using the pseudo-Hilbert transform, H' { }, the imaginary part of the equalizer output is generated as shown below in EQN. 12.

$$x_I(k) \equiv H'\{x_R(k)\} = \qquad \text{EQN. 12}$$
$$H'\{\cos(\theta(k))s(k) - H'\{\sin(\theta(k))H'\{s(k)\}\} + H'\{n'_R(k)\} \approx$$
$$\cos(\theta(k))v(k) + \sin(\theta(k))s(k) + H'\{n'_R(k)\}$$

where it is again assumed that the phase noise is relatively constant over a short duration filter, making $\cos(\theta(k))$ and $\sin(\theta(k))$ multiplicative constants. An important property of a Hilbert transform is that $H\{H\{x(k)\}\} = -x(k)$. Although not strictly true for the pseudo-Hilbert transform, it is noted that the pseudo-Hilbert transform retains this property in an approximate sense, $H'\{H'\{x(k)\}\} \approx -x(k)$. The input into the phase tracker is then expressed below as EQN. 13.

$$x(k) = x_R(k) + ix_I(k) \approx e^{i\theta(k)}[s(k) + iv(k)] + n_R'(k) + iH'\{n_R'(k)\} \qquad \text{EQN. 13}$$

A diagram of a decision-directed ("DD") phase tracking loop 300 for quadrature amplitude modulation ("QAM") is illustrated in FIG. 6. All indices shown refer to the symbol rate. The complex input, x(k), 305 is de-rotated by the current phase estimate, $\hat{\theta}(k)$, 310. The resultant de-rotated signal, y(k), 315 is input into a decision device 320 (e.g., a slicer) and an error generator 325. The error generator 325 uses the de-rotated signal, y(k), 315 and complex symbol decision, ĉ(k), 330 to generate an instantaneous error estimate, e(k), 335. The instantaneous error estimate 335 is low-pass filtered in a low-pass filter 340 to generate the phase estimate 310. A look-up table ("LUT") is then used to compute $e^{-i\hat{\theta}(k)}$ to de-rotate the received signal.

One measure of the performance of the error generator 325 is an S-curve. The S-curve is defined as the expectation of an error signal for a fixed value of the difference between the actual phase noise and the phase estimate, $\psi = \theta - \hat{\theta}$. That is, $$S(\psi) = E\{e(k)|\psi\} \qquad \text{EQN. 14}$$

Another measure of the performance of the error generator 325 is variance. A good error generator's S-curve is linear about the origin and has a low variance. Thus, for unbiased error generators, the instantaneous error estimate is expressed using EQN. 15.

$$e(k) = S(\theta(k) - \hat{\theta}(k)) + N(k) \approx A(\theta(k) - \hat{\theta}(k)) + N(k) \qquad \text{EQN. 15}$$

where A is the slope of the S-curve about the origin. The S-curve and slope A are obtained experimentally. The bandwidth of the phase tracking loop 300 is calculated using EQN. 16.

$$B_L = \frac{1}{T} \cdot \frac{\gamma A}{2(2 - \gamma A)} \qquad \text{EQN. 16}$$

Therefore, with a known S-curve slope for the error generator 325, the bandwidth of the phase tracking loop is adjusted using the parameter of the loop filter, $\gamma$, and changes based on the specifications of the tuner 205 used.

SUMMARY

In one embodiment, the invention provides a method of tracking phase in a vestigial sideband receiver. The receiver is configured to receive radio frequency signals modulated with data including coded symbols and uncoded symbols. The method includes demodulating, in a demodulator, the received radio frequency signals to produce the coded symbols and the uncoded symbols, and decoding, in a decoder, the coded symbols to produce corresponding decoded symbols. The method also includes generating a plurality of symbol decisions related to the received radio frequency signals; determining a phase tracking threshold value based on a mean square error; estimating an imaginary component of a transmitted signal based on the symbol decisions; and determining a phase estimate based on the imaginary component of the transmitted signal and the plurality of symbol decisions. A first phase tracking technique is selected when the phase estimate is greater than the phase tracking threshold value, and a second phase tracking technique is selected when the phase estimate is less than the phase tracking threshold value.

In another embodiment, the invention provides a method of tracking phase in a vestigial sideband receiver. The receiver is configured to receive radio frequency signals modulated with data including coded symbols and uncoded symbols. The method includes demodulating, in a demodulator, the received radio frequency signals to produce the coded symbols and the uncoded symbols, and generating a plurality of symbol decisions related to the received radio frequency signals. The method also includes determining a phase tracking threshold value based on a mean square error; estimating an imaginary component of a transmitted signal based on the symbol decisions; and switching, in the phase tracking module, from a first phase tracking technique to a second phase tracking technique when a phase estimate crosses the phase tracking threshold.

In yet another embodiment, the invention provides a system for tracking phase. The system is configured to receive radio frequency signals modulated with data including coded symbols and uncoded symbols. The system includes, among other things, a demodulator, a decoder, and a phase tracking module. The demodulator demodulates the received radio frequency signals to produce the coded symbols and the uncoded symbols. The decoder decodes the coded symbols to produce corresponding decoded symbols. The phase tracking module receives a plurality of symbol decisions related to the received radio frequency signals, determines a phase tracking threshold value based on a mean square error, receives an estimated imaginary component of a transmitted signal based on the symbol decisions, and determines a phase estimate based on the imaginary component of the transmitted signal and the plurality of symbol decisions. The phase tracking module selects one of a first phase tracking technique and a second phase tracking technique based on the phase estimate. The first phase tracking technique is selected when the phase estimate is greater than the phase tracking threshold value, and the second phase tracking technique is selected when the phase estimate is less than the phase tracking threshold value.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention herein describe systems and methods for tracking phase in a vestigial sideband ("VSB") receiver, such as an 8VSB receiver. Signals sent from a digital data transmitter (i.e., transmitted signals) to a digital data receiver include both real and imaginary components. When the transmitted signals are received, phase noise is introduced by, among other things, a tuner within the receiver. Carrier recovery algorithms such as frequency and phase locked loop ("FPLL") carrier recovery algorithms are able to remove much of the phase noise introduced by the tuner. However, residual phase noise outside of the bandwidth of the FPLL propagates to other parts of the receiver. Phase tracking modules are connected to the output of an equalizer to remove the residual phase noise. Phase trackers for VSB receivers, such as those which use a Horwitz architecture (described in greater detail below), are only able to track the residual phase noise under certain signal conditions (e.g., high signal-to-noise ratio ("SNR")). In fact, when SNR is low, the Horwitz phase tracking architecture actually degrades the receiver's overall performance.

VSB phase trackers such as the Horwitz use only the real part of the transmitted signal to track phase noise. According to embodiments of the invention, a VSB phase tracker is modeled as a decision directed ("DD") quadrature amplitude modulation ("QAM") phase tracker, which uses both real and imaginary components of the transmitted signal, enabling the phase tracker to track the phase noise during low SNR conditions. As such, if the imaginary component of the transmitted signal is determined in the receiver, the combination of the QAM phase tracker and the Horwitz phase tracker is able to effectively track the phase at the output of the equalizer. The output of the real equalizer and the complex input to the phase tracker were described with respect to EQNS. 9 and 13.

Figure 7:
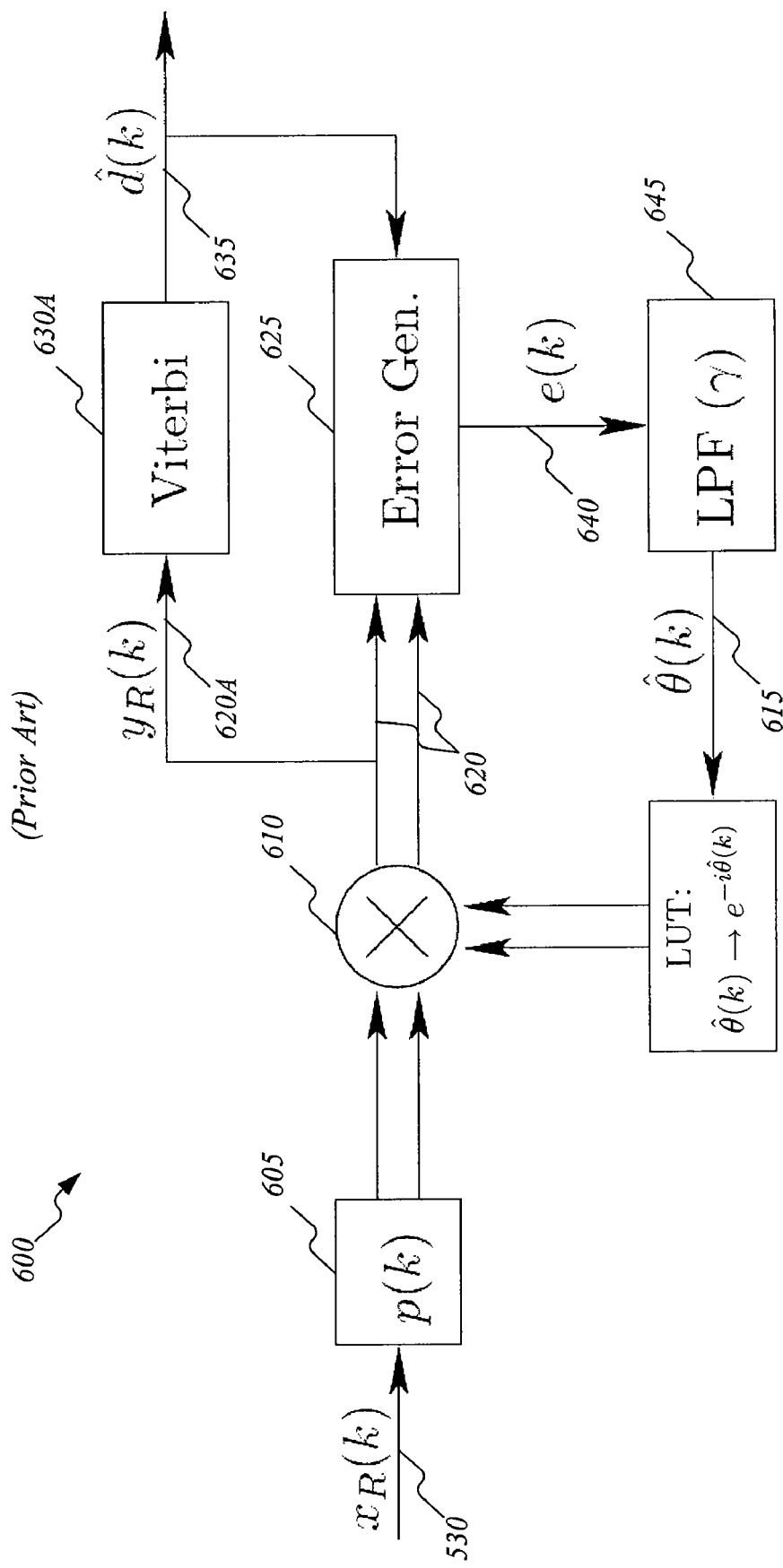
FIG. 7 is a diagram of a phase tracking loop in an 8VSB receiver.

FIG. 7 illustrates a phase tracking architecture 600 referred to herein as a Horwitz phase tracker, a Horwitz phase tracking technique, or a Horwitz phase tracking architecture. Although different error generators for computing e(k) have been developed, the Horwitz phase tracking architecture 600 remains prevalent in the art. The output of the complex filter, p(k), 605, which has 2K+1 taps and thus a delay of K+1 symbols, is a complex input, $x_R(k)+x_I(k)$, to a multiplier 610. The complex input has a reference 'symbol,' $s(k)+i*v(k)$, and is de-rotated by the phase estimate, $\hat{\theta}(k)$, 615. The complex de-rotated data, $y(k)=y_R(k)+iy_I(k)$, 620, is then input into the Horwitz error generator 625, while the real part 620A of the de-rotated data is input into a zero-delay decision device 630A. The decision device 630A provides an estimate of the real symbol, $\hat{d}(k)$, 635 to the error generator 625. The error generator 625 computes an estimate, e(k), 640 of the phase error. The phase error estimate 640 is then low-pass filtered in a low-pass filter 645 to form the phase estimate 615. The phase estimate is input into a LUT which outputs $e^{-i\hat{\theta}(k)}$ to de-rotate the input signal, x(k).

The phase is computed based on the quadrature component, $y_I(k)$, using a series of look-up tables ("LUTs"), and the difference between the in-phase component and the corresponding symbol decision, $y_R(k)-\hat{d}(k)$. The quadrature component is used in determining the sign of the error signal in addition to scaling the error signal for large $y_I(k)$. The Horwitz error signal is determined using EQN. 17.

$$a_1 = LUT_1\{y_I(k)\}$$

$$a_2 = LUT_2\{\hat{d}y_R(k)\}$$

$$e(k) = LUT_3\{a_1, a_2\} \qquad \text{EQN. 17}$$

where LUT1, LUT2, and LUT3 are different look-up tables. LUT2 is a function of both the in-phase component and the decision, $\hat{d}(k)$, and LUT3 is a function of the outputs of LUT1 and LUT2. The Horwitz error signal determined using EQN. 17 is robust in determining decision errors, but exhibits a high variance in the instantaneous error estimates for low signal-to-noise ratios ("SNRs").

The Horwitz phase tracking architecture of FIG. 7 (like other phase tracking architectures for 8VSB signals) does not use information related to the imaginary component of the transmitted signal, which is known if reliable symbol decisions are available. Therefore, the Horwitz phase tracking architecture is not utilizing all of the information related to the transmitted signal that can be determined in the receiver.

One embodiment of the invention uses a relationship between the symbol decisions from a decision device 630B and the imaginary component of the transmitted signal to track the phase of the transmitted signal in a receiver, even though the imaginary component of the transmitted signal is not part of a discrete symbol set and contains no data information. For example, the output of a matched filter in an ideal channel (e.g., a channel with no multipath signals and no noise) is given below in EQN. 18.

$$r_{mf,ideal}(k) = \sum_{m=-L}^{L} s(k-m)p(m) = s(k) + i\underbrace{\sum_{m=-L}^{L} s(k-m)p_I(m)}_{v(k)} \qquad \text{EQN. 18}$$

If a decision device 630B is able to make reliable symbol decisions, an estimate of the imaginary component, v(k), of the transmitted VSB signal (or a delayed version, v(k−K),) (see FIG. 8) can be computed and passed to a phase tracker.

Figure 9:
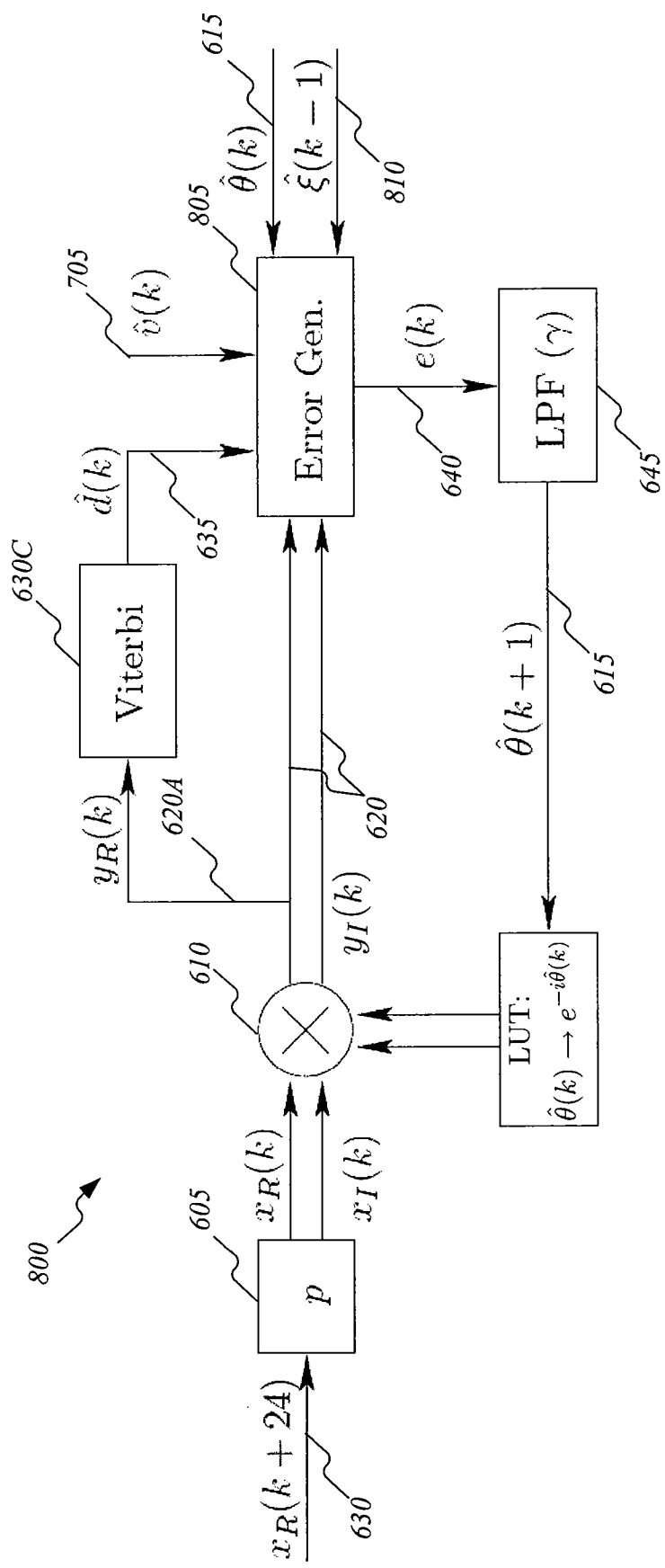
FIG. 9 is a diagram of a phase tracking loop according to an embodiment of the invention.

As previously demonstrated by EQN. 13, the phase in the received signal, x(k), includes three components: (1) the phase noise introduced by the tuner, θ(k); (2) the phase of the transmitted signal; and (3) the phase from the noise term. Prior phase tracking architectures consider the transmitted phase to be unknown because the transmitted phase is a random variable that has a mean value of zero and is averaged out using a low pass filter. However, if reliable decisions are available, the imaginary component of the transmitted signal can be computed. The complex transmitted symbol, $\hat{c}(k)=\hat{d}(k)+i\hat{v}(k)$, shown as 635 (i.e., an output of a decision device 630C) and 705 in FIG. 9, are input to the error generator 805. Additionally, because the same filter is being used to generate $x_I(k)$ and $\hat{v}(k)$, the corresponding filter delays are the same and additional delays are not needed.

In an embodiment, the phase tracking system is modeled as a DD QAM carrier phase tracking system with a noisy complex input signal, $x(k)=xR(k)+ixI(k)$, and symbol decisions, $\hat{c}(k)=\hat{d}(k)+i\hat{v}(k)$. In order to track the phase in a closed loop system, such as that illustrated in FIG. 6, the phase estimate is updated and an instantaneous error is given by EQN. 19 below $$e(k) = Im\{\hat{c}^*(k)x(k)e^{-i(\hat{\theta}k)}\} = y_I(k)\hat{d}(k) - y_R(k)\hat{v}(k) \qquad \text{EQN. 19}$$

where $y(k)=yR(k)+iyI(k)$ is the rotated signal 620. The error signal in EQN. 19 is derived for a DD QAM carrier phase tracking system (not a VSB system). However, the VSB phase tracker violates the QAM system in the following ways: (1) the real and imaginary components of the transmitted symbol are not independent (i.e., the imaginary component is related to the real component by the pseudo-Hilbert transform); (2) the noise term $n'_R(k)+i*H'\{n_R'(k)\}$ is not white noise; and (3) the real and imaginary parts of the additive noise are related by the pseudo-Hilbert transform. Although these assumptions for a DD QAM carrier phase tracking system are violated, testing shows that the assumptions do not diminish the performance of the VSB phase tracker.

Figure 8:
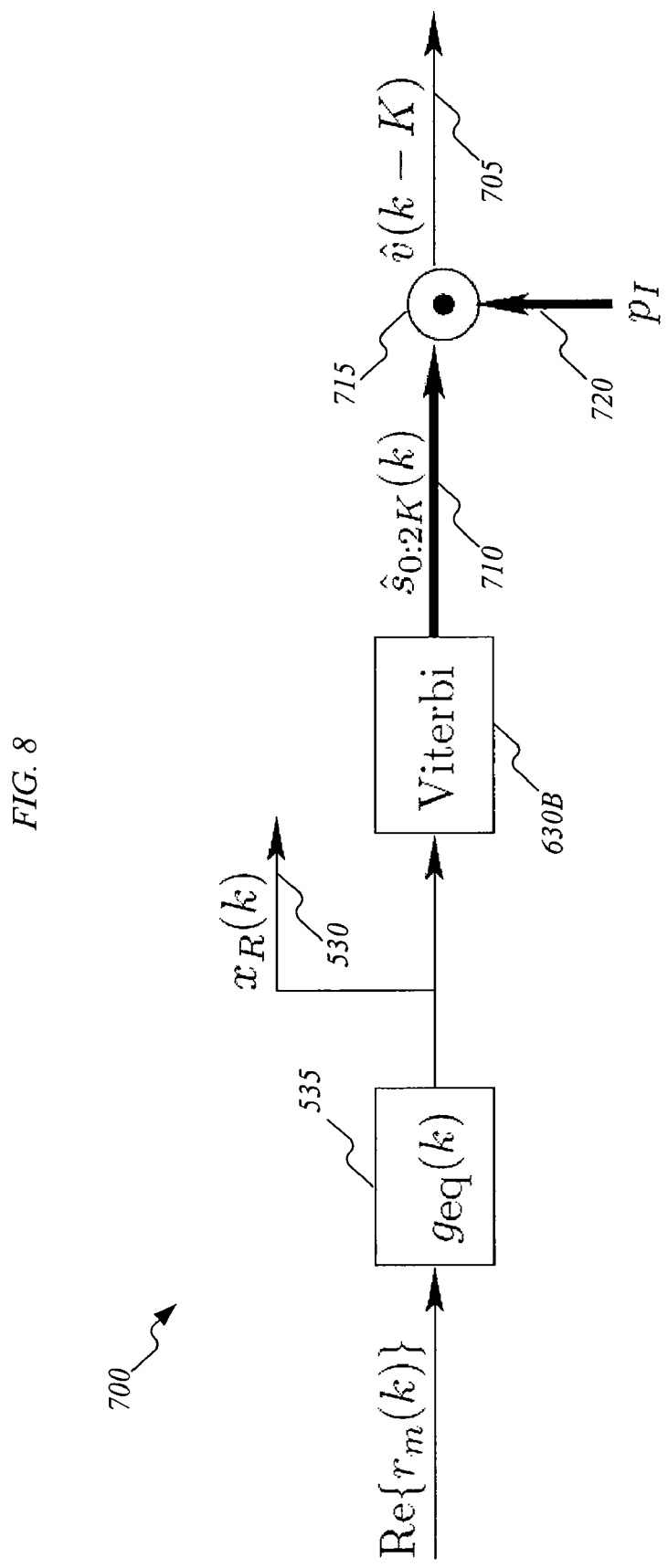
FIG. 8 shows the outputs of an equalizer which are provided to a phase tracking module.

An estimate of the imaginary component of the transmitted signal is calculated for use in EQN. 19, as illustrated in FIG. 8. The estimate of the imaginary component, $\hat{v}(k)$, 705, of the transmitted signal is based on the equalizer symbol decisions, $\hat{s}(k)$, 710, as shown below in EQN. 20.

$$\hat{v}(k-K) = \sum_{m=0}^{2K} \hat{s}(k-m)p_I(m) \qquad \text{EQN. 20}$$

where the imaginary part of the raised cosine pulse has 2K+1 taps. When the decision device is a Viterbi decoder, a prior symbol decision can be updated if the symbol has not exhausted its trace back depth. As a consequence, the notation of EQN. 21 is used.

$$\hat{s}_{0:2K}(k) = [\hat{s}(k-2K), \ldots, \hat{s}(k-1), \hat{s}(k)] \qquad \text{EQN. 21}$$

It is also possible for decision $\hat{s}(m)$ to be different in vectors $\hat{s}_{0:2K}(k)$ and $\hat{s}_{0:2K}(k+1)$, for $m=k-2K+1, \ldots, k$. As a result, $\hat{v}(k)$, 705 is expressed as a dot product 715 between the most recent 2K+1 symbol decision from the decision device and the imaginary part of the raised cosine pulse, $p_I$, 720, as shown in EQN. 22.

$$\hat{v}(k-K) = \langle \hat{s}_{0:2K}(k), p_I \rangle \qquad \text{EQN. 22}$$

Figure 1:
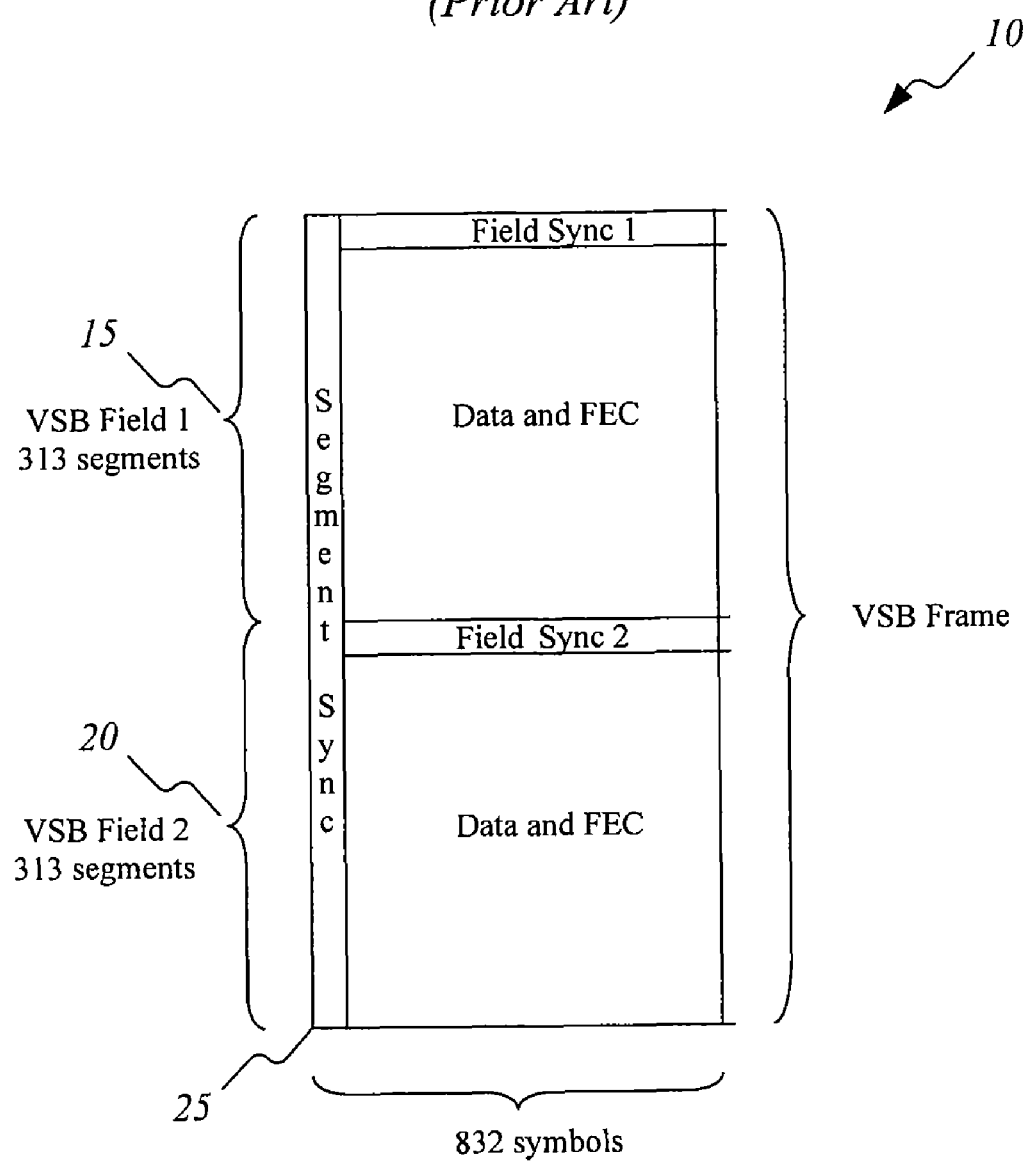
FIG. 1 illustrates an 8 vestigial sideband ("8VSB") data frame.
Figure 2:
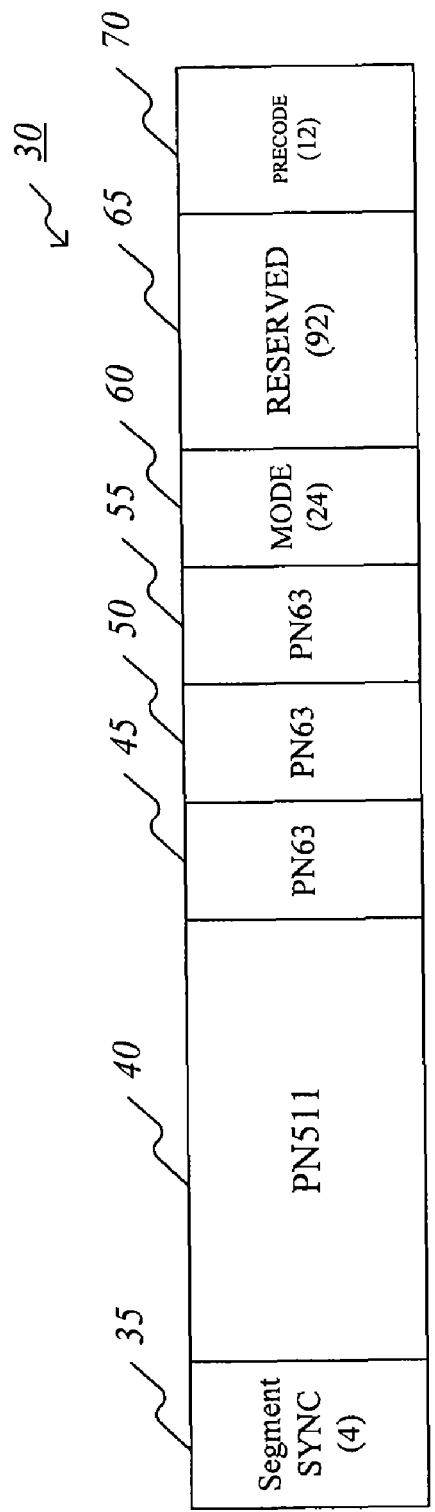
FIG. 2 illustrates a field sync segment.
Figure 3:
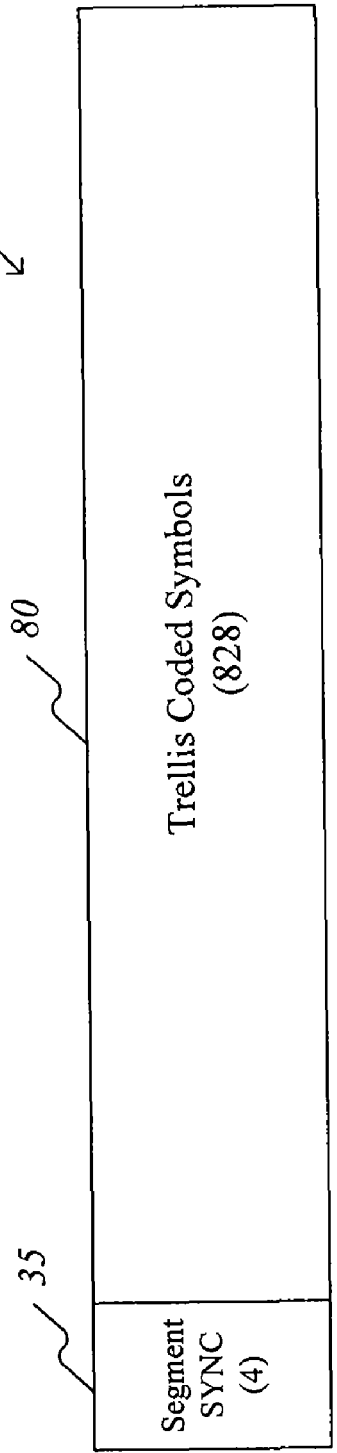
FIG. 3 illustrates a data segment.
Figure 4:
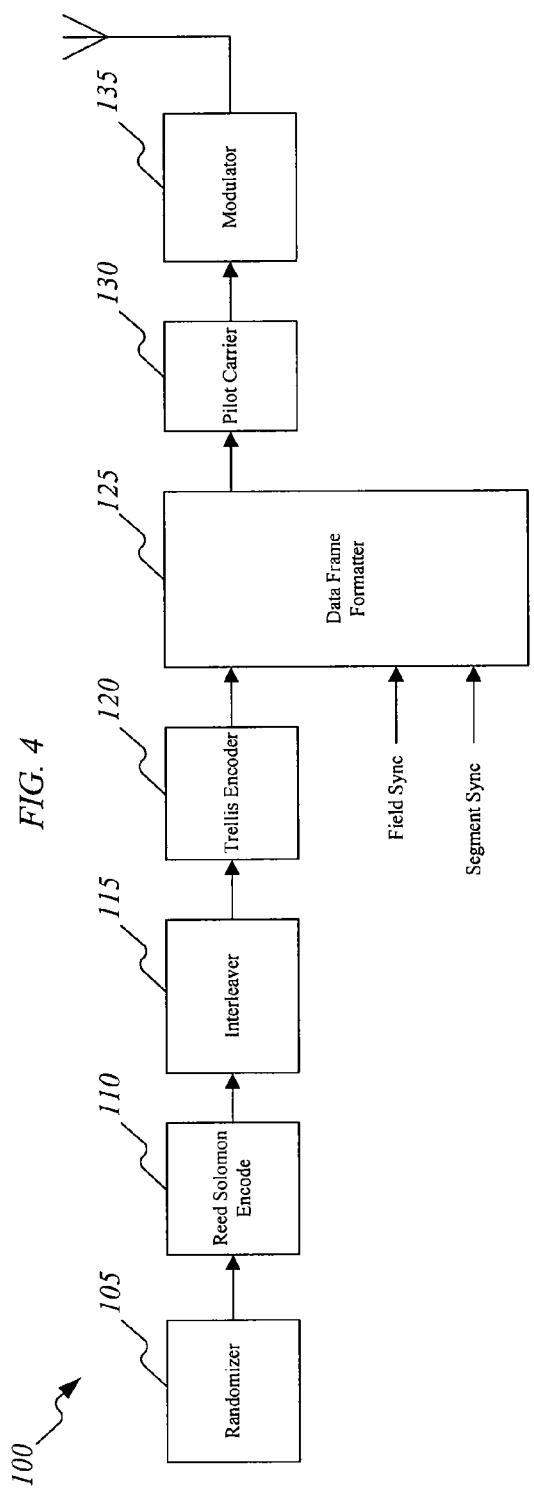
FIG. 4 illustrates a digital data transmitter.
Figure 5:
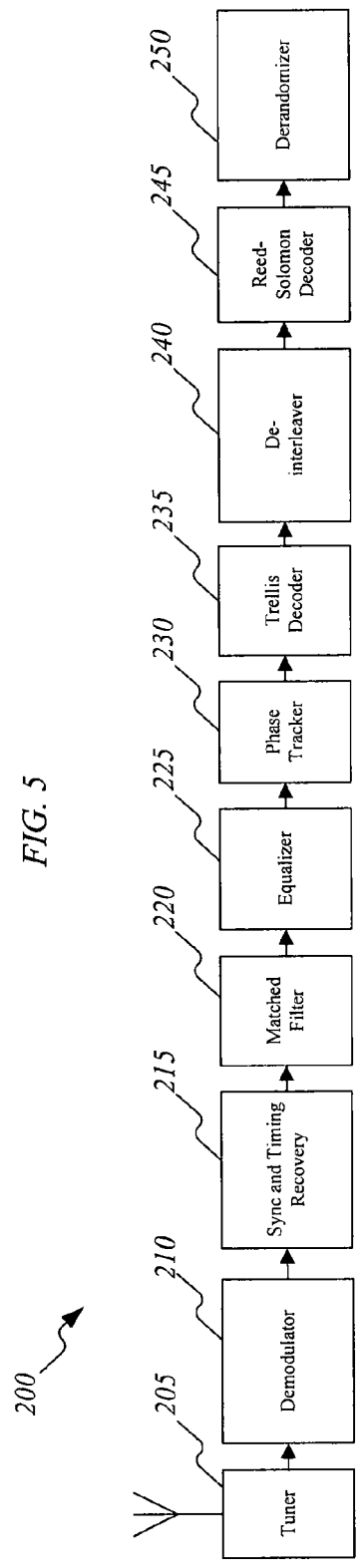
FIG. 5 illustrates a digital data receiver.
Figure 6:
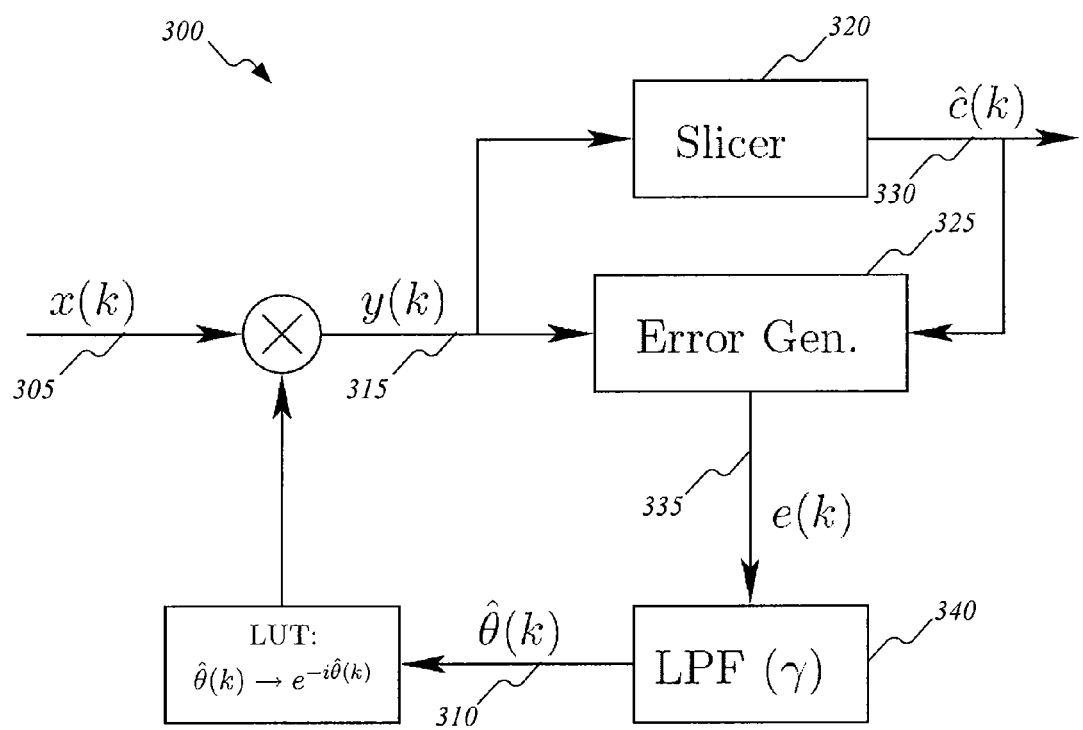
FIG. 6 is a diagram of a decision-directed quadrature amplitude modulated ("QAM") carrier phase recovery loop.

The Horwitz error generator given in EQN. 17 is robust to decision errors and phase noise having large peak-to-peak fluctuations and a low mean-squared error ("MSE"). However, the Horwitz architecture does not adequately track phase noise in situations where the MSE is high (i.e., a low SNR). The DD QAM phase instantaneous error generator shown in EQN. 19 in the context of the architecture of FIG. 6 is effective during high MSE conditions, but is ineffective when the phase noise, θ(k), exhibits large peak-to-peak fluctuations. The poor performance is primarily due to a large number of incorrect symbol decisions output from the Viterbi decoder. If the phase noise is large, even if rotating slowly, the symbol constellation has been rotated such that the symbol decisions are unreliable.

As such, the above phase tracking techniques complement each other (i.e., each technique performs well under conditions in which the other technique performs poorly). According to an embodiment of the invention, a phase tracker, such as the phase tracker 800 shown in FIG. 9, combines the two techniques using the general architecture of FIG. 6. Although the invention is described primarily with respect to the Horwitz and QAM phase tracking techniques, additional phase tracking techniques can also be used in place of the Horwitz error generator or in combination with the Horwitz error generator and the QAM techniques.

A phase tracking threshold value, $θ_s$, is used by the error generator 805 to determine if a phase noise is large. The phase tracking threshold value, $\theta_s$, is based on a value of the MSE estimate from a previous MSE sample, $\hat{\xi}(k-1)$, 810. Depending on the MSE, a value for the phase tracking threshold, $\theta_s$, is selected from a set of possible values, where $\theta_s$ decreases for decreasing MSE. The MSE is generated in a manner similar to that described in U.S. patent application Ser. No. 11/687,909, titled "METHOD FOR CHANNEL TRACKING IN AN LMS ADAPTIVE EQUALIZER FOR 8VSB," filed Jul. 11, 2007, the entire contents of which are hereby incorporated by reference. If the phase estimate is greater than the phase tracking threshold value, the Horwitz error generator of EQN. 17 is used. Otherwise, the QAM error generator of EQN. 19 is used.

The S-curve and the variance are used to evaluate the performance of the Horwitz and the QAM phase trackers for known signal conditions, as described below. The VSB symbols are convolved with a complex root raised cosine pulse and summed with white Gaussian noise to produce a SNR of 17 decibels ("dB"), which is then convolved with the matched filter (previously described). The complex matched filter output is rotated by a constant phase angle before the real part of the output is extracted. The signal is input into the pseudo-Hilbert transform which is used in a decision device which makes perfect symbol decisions. The mean and variance of 100,000 error estimates are taken to produce each data point in the plots illustrated in FIGS. 10-13.

Figure 10:
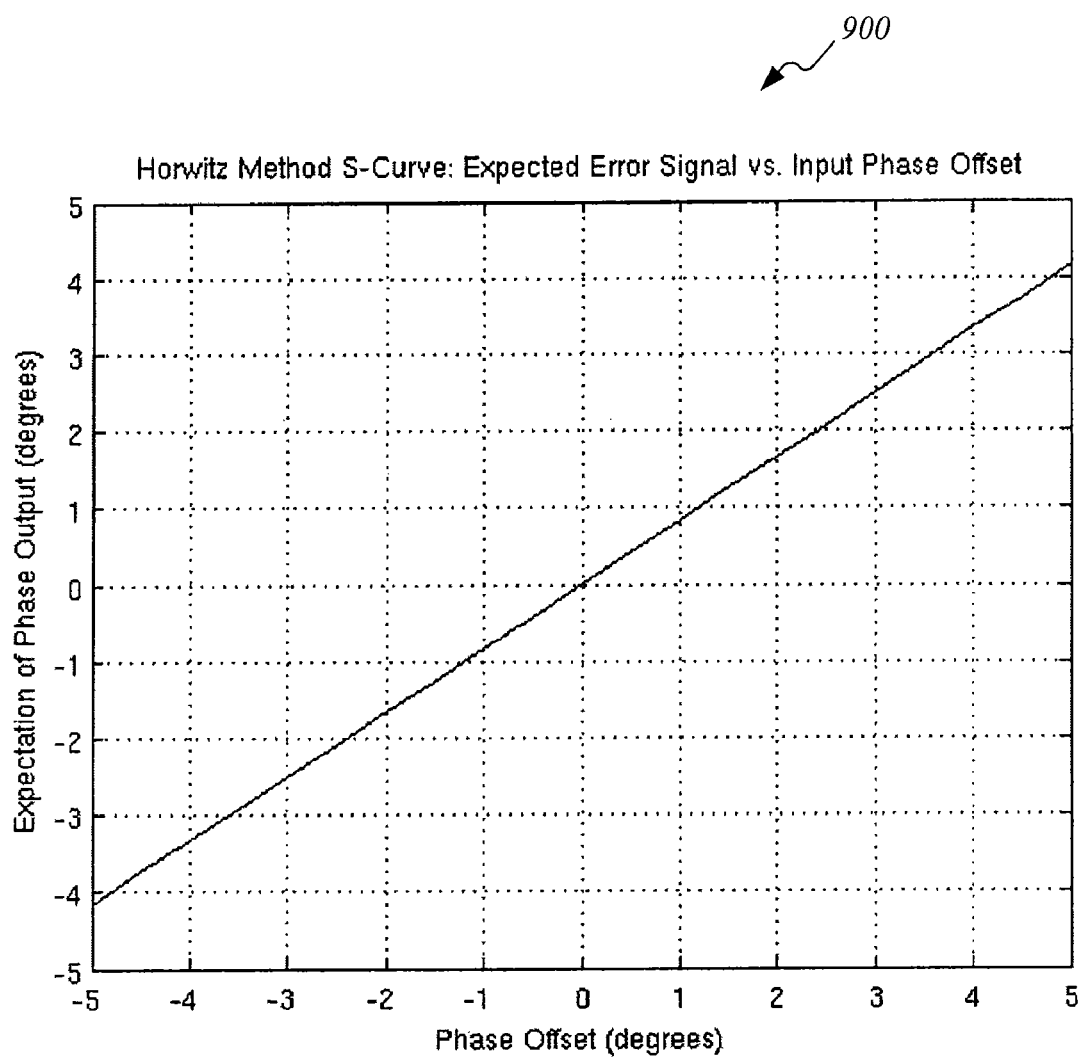
FIG. 10 shows a Horwitz phase tracker S-curve.
Figure 11:
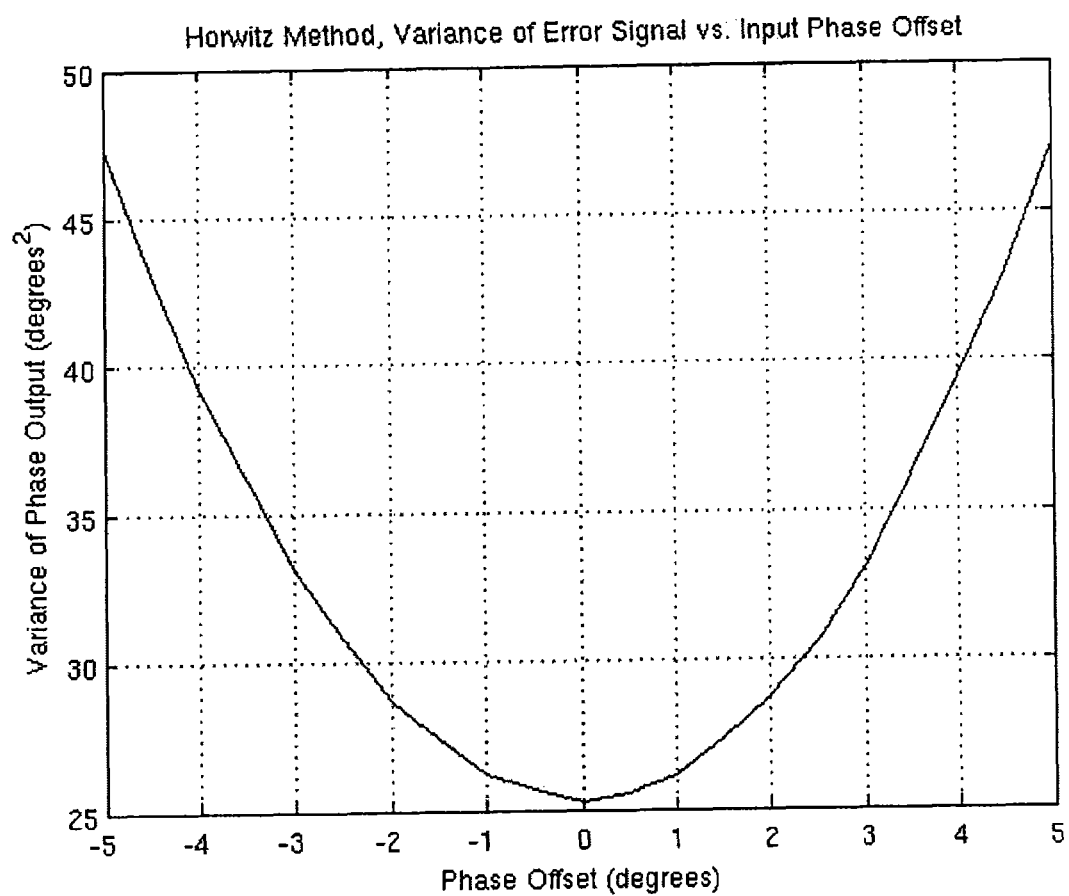
FIG. 11 shows an error signal variance for a Horwitz phase tracker.
Figure 12:
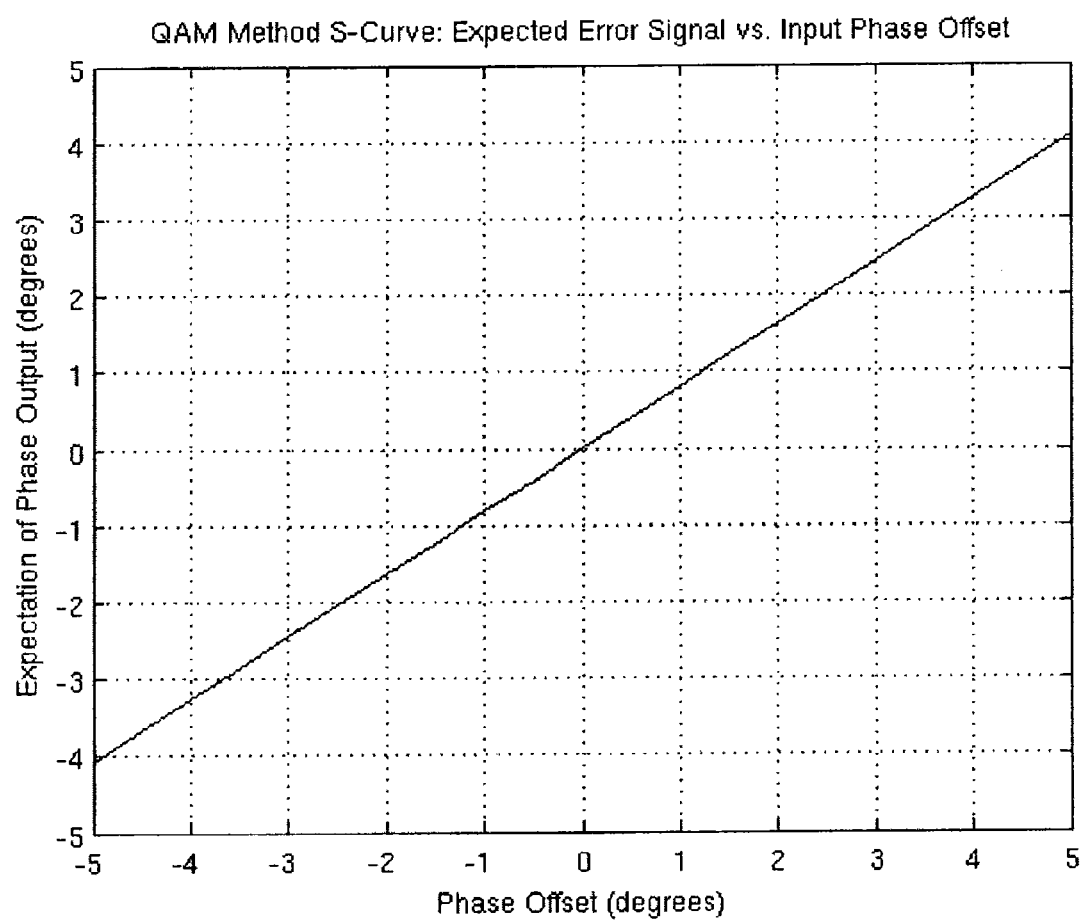
FIG. 12 shows a phase tracker S-curve for a phase tracker according to an embodiment of the invention.
Figure 13:
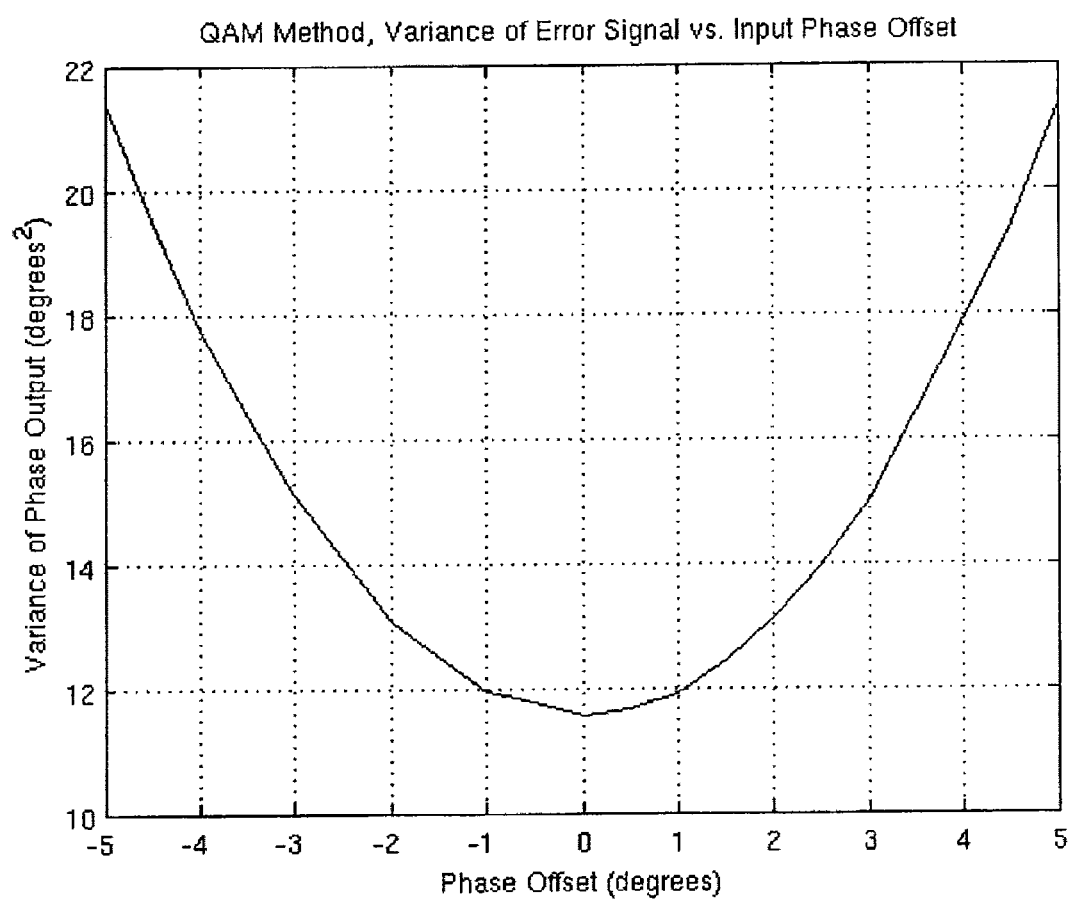
FIG. 13 shows an error signal variance for a phase tracker according to an embodiment of the invention.

As seen in FIGS. 10 and 12, respectively, the S-curve 900 for the Horwitz phase tracker and the S-curve 905 for the QAM phase tracker each exhibit a linear slope about the origin. However, the variance 910 of the QAM technique is substantially lower than the variance of the Horwitz 915 (see FIGS. 13 and 11, respectively). For example, in the illustrated embodiment, the variance 915 of the Horwitz is approximately 25 $\deg^2$ for a phase offset of 0 $\deg^2$, and the variance 910 of the QAM technique is approximately 11.5 $\deg^2$ for a phase offset of 0 $\deg^2$.

Figure 14:
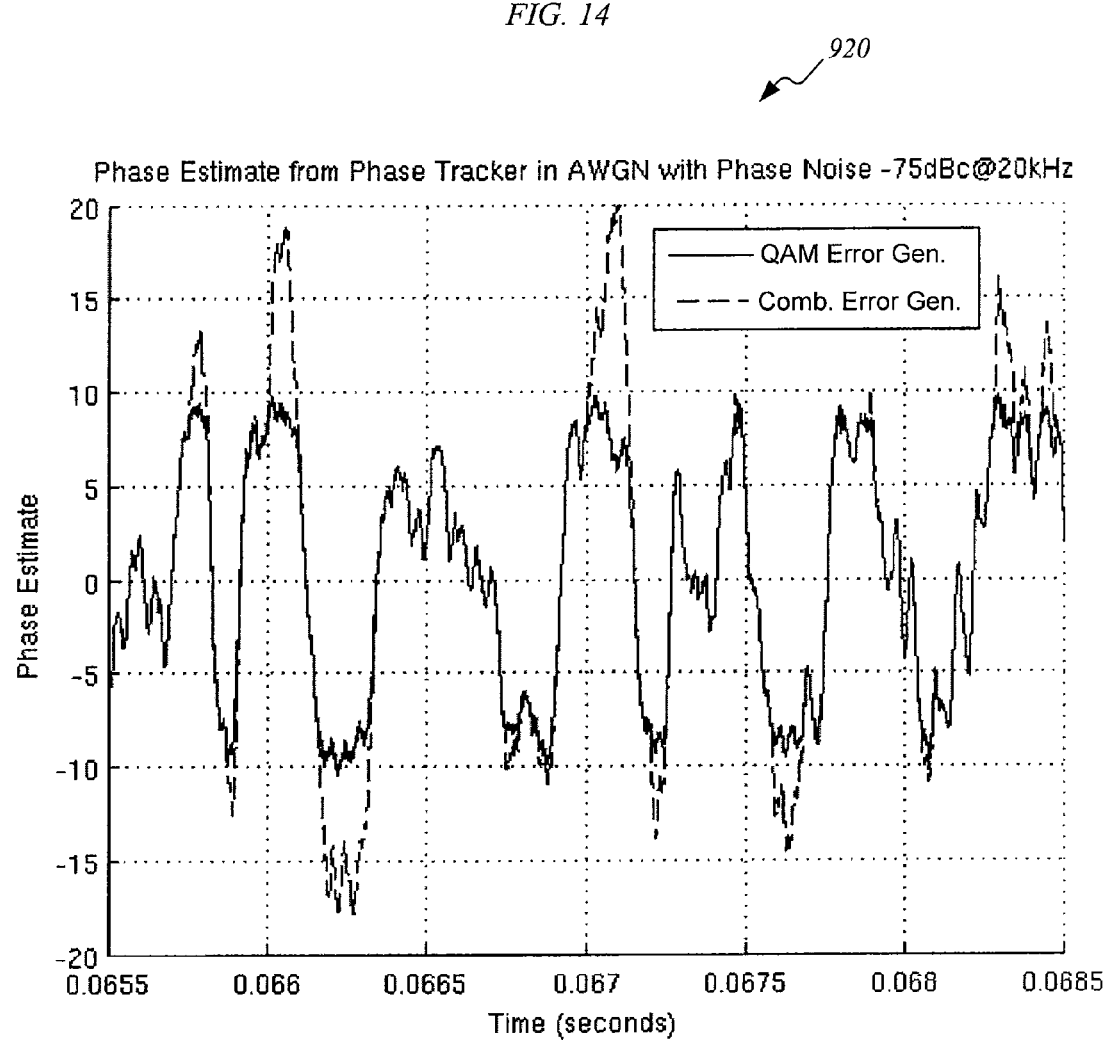
FIG. 14 shows a phase estimate from a phase tracker according to an embodiment of the invention.

FIG. 14 illustrates a phase estimate for the QAM phase tracking technique and a combination of the QAM and the Horwitz phase tracking techniques. The QAM phase tracking technique works well in situations when the phase estimate is below approximately 8 $\deg^2$. However, when the phase estimate is greater than 8 $\deg^2$, the QAM phase tracking technique is not able to track the phase. When the phase estimate is greater than 8 $\deg^2$, the phase tracking loop of FIG. 9 switches from the QAM phase tracking technique to the Horwitz phase tracking technique, and the Horwitz phase tracking technique is able to track the phase of the received signal.

Figure 15:
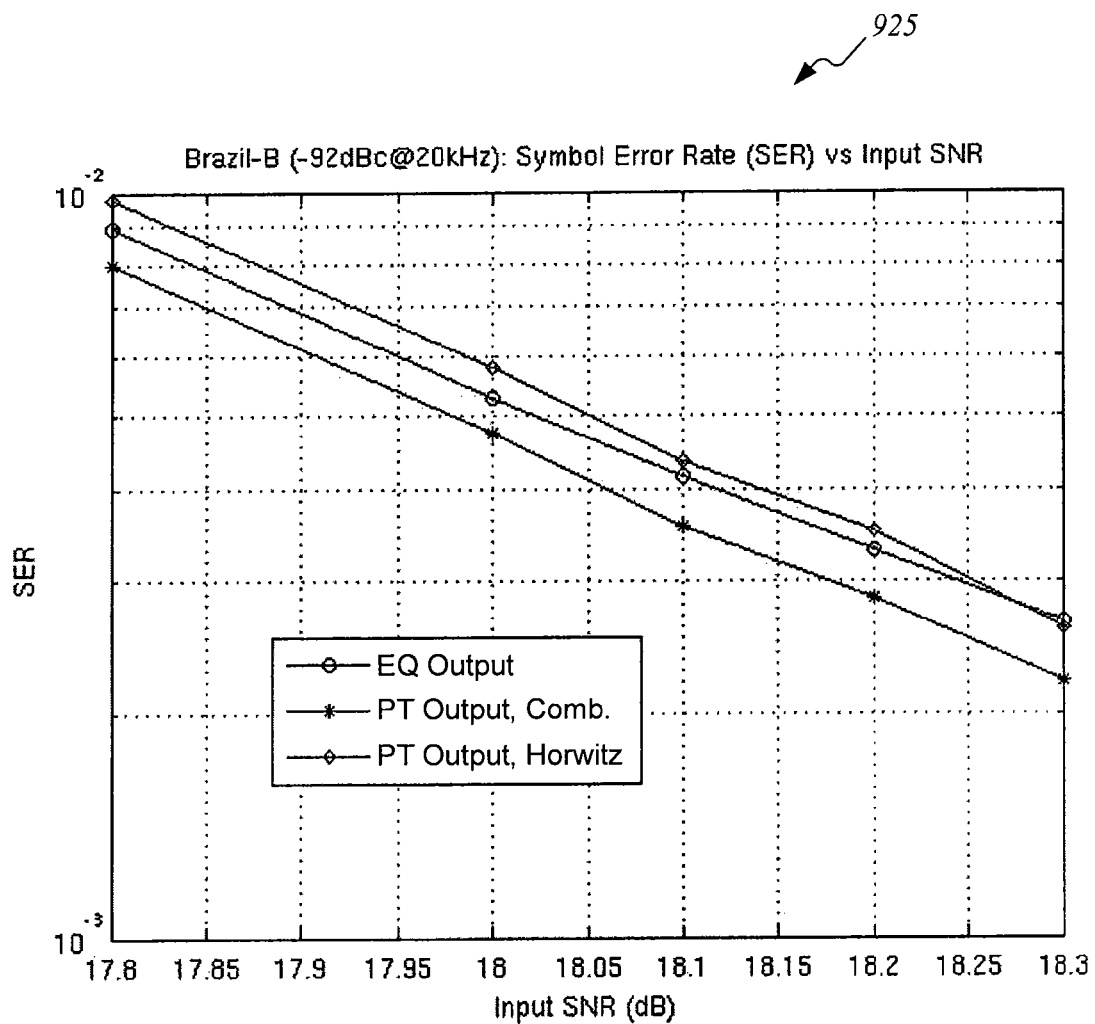
FIG. 15 shows a comparison of symbol error rates ("SERs") for a plurality of input signal-to-noise ratios ("SNRs") for an output of an equalizer, an output of a Horwitz phase tracker, and an output of a phase tracker according to an embodiment of the invention.
Figure 16:
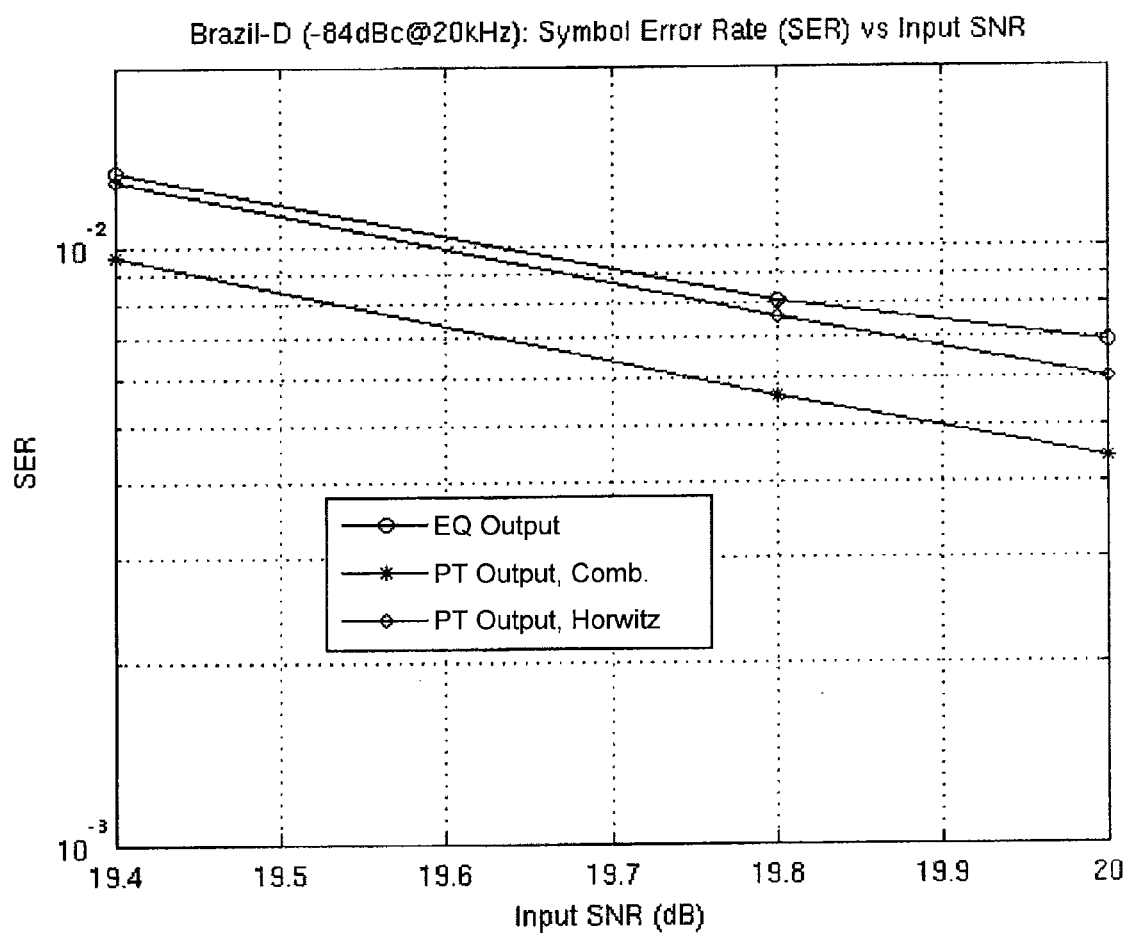
FIG. 16 shows a comparison of the SERs for a plurality of input SNRs at the output of the equalizer, the output of the Horwitz phase tracker, and the output of the phase tracker according to an embodiment of the invention.

FIGS. 15 and 16 illustrate plots 925 and 930 of the input SNR versus the symbol error rate ("SER") for the output of the equalizer, the output of the Horwitz phase tracker, and the output of the combination of the Horwitz and QAM phase trackers for a heavy multipath channel. Comparisons were made for two tuners: (1) a "good" tuner which produces phase noise with a power of −92 dBc at 20 kHz from the carrier; and (2) a "bad" tuner which produces phase noise with a power of −84 dBc at 20 kHz from the carrier. The carrier recovery loop bandwidth is set to 6 kHz and 25 kHz for the "good" and "bad" tuners, respectively.

Testing shows that to provide a packet error rate ("PER") from a Reed Solomon decoder of no more than 0.0002 (i.e., the ratio of the number of incorrectly received packets to the total number of received packets), the SER from a phase tracker should be less than approximately 0.006 (i.e., the ratio of the number of incorrectly received symbols to the total number of received symbols). In order to analyze the performance of the two phase trackers, a comparison is made between (1) the SNR required at the input to the phase tracking loop to achieve a target SER for the Horwitz phase tracking technique and (2) the SNR required at the input to the phase tracking loop to achieve the target SER for the combination of the Horwitz and QAM phase trackers.

FIG. 15 illustrates the relationship 925 between input SNR and SER for the "good" tuner. In order to achieve a given SER, a corresponding SNR is required. For example, to achieve a SER of 0.004, the output of the equalizer requires an input SNR of 18.12 decibels ("dBs"). Using only the Horwitz phase tracker, to achieve a SER of 0.004 requires an input SNR of approximately 18.15 dBs. However, using the combination of the QAM and Horwitz phase trackers, achieving a symbol error rate of 0.004 at the output of the phase tracking module requires an input SNR of only 18.06 dBs. Those skilled in the art will recognize that the difference between the required input SNRs, though small, represents a substantial improvement in the performance of a receiver.

A similar relationship 930 is illustrated in FIG. 16 for the "bad" tuner. For example, to achieve a SER of 0.008 at the output of the equalizer, an input SNR of approximately 19.8 dBs is required. To achieve the same SER at the output of the phase tracking module when only the Horwitz phase tracker is used, an input SNR of approximately 19.75 dBs is required. However, using the combination of the QAM and the Horwitz phase trackers, an input SNR of only 19.54 dBs is required to achieve the same SER.

Figure 17:
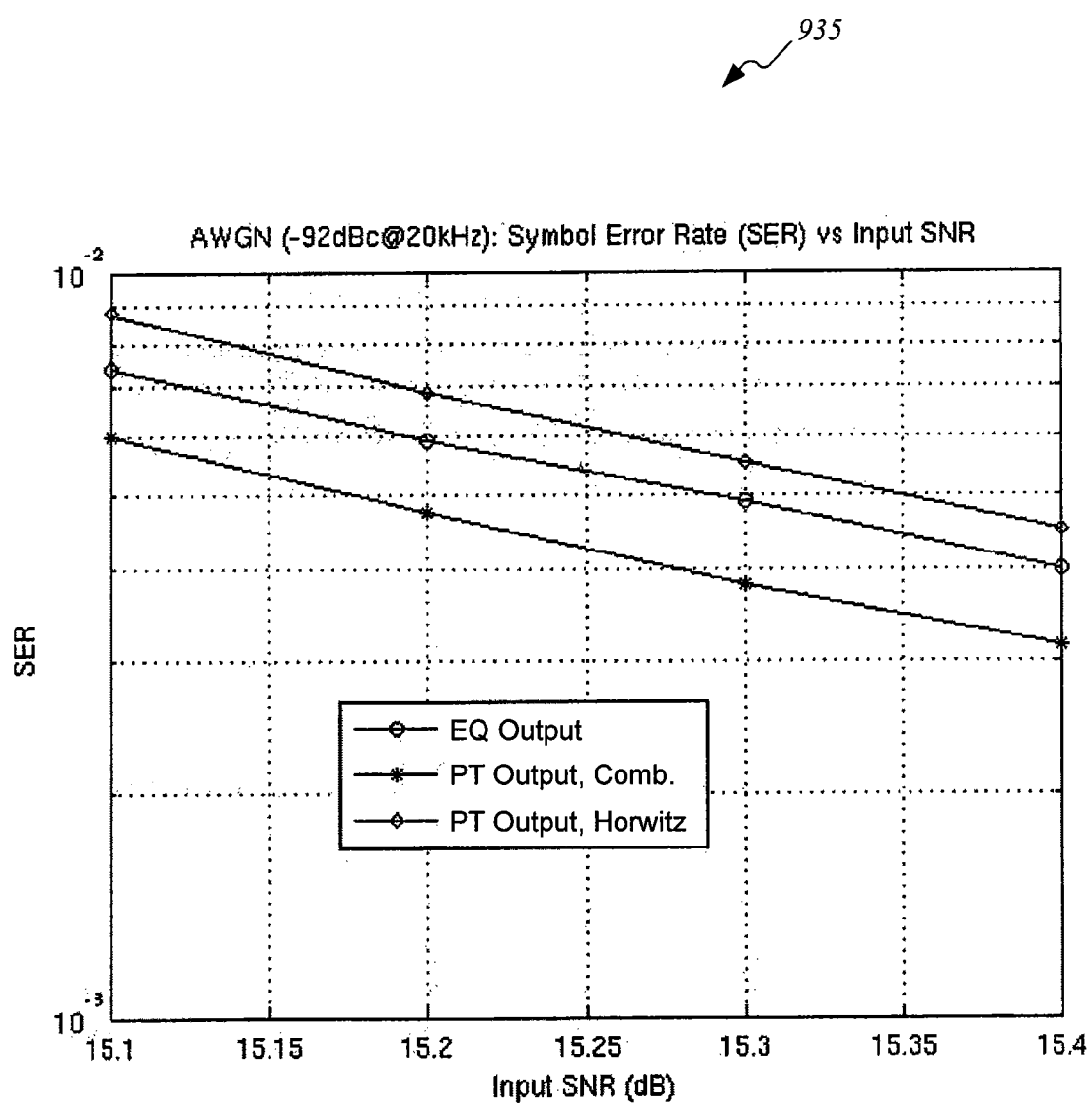
FIG. 17 shows a comparison of the SERs for a plurality of input SNRs at the output of the equalizer, the output of the Horwitz phase tracker, and the output of the phase tracker according to an embodiment of the invention.

A similar relationship 935 to those described above with respect to FIGS. 15 and 16 is illustrated in FIG. 17 for an additive white Gaussian noise channel (i.e., a channel with no multipath) and a "good" tuner. Similar to FIG. 15, the Horwitz phase tracker (like many 8VSB phase trackers) actually degrades the performance of the equalizer and requires a larger input SNR to achieve the same SER. For example, the Horwitz phase tracker requires an input SNR of 15.35 dBs to achieve a SER of 0.005. However, the combination of the QAM and Horwitz phase trackers requires an input SNR of approximately 15.17 dBs to achieve the same SER.

Figure 18:
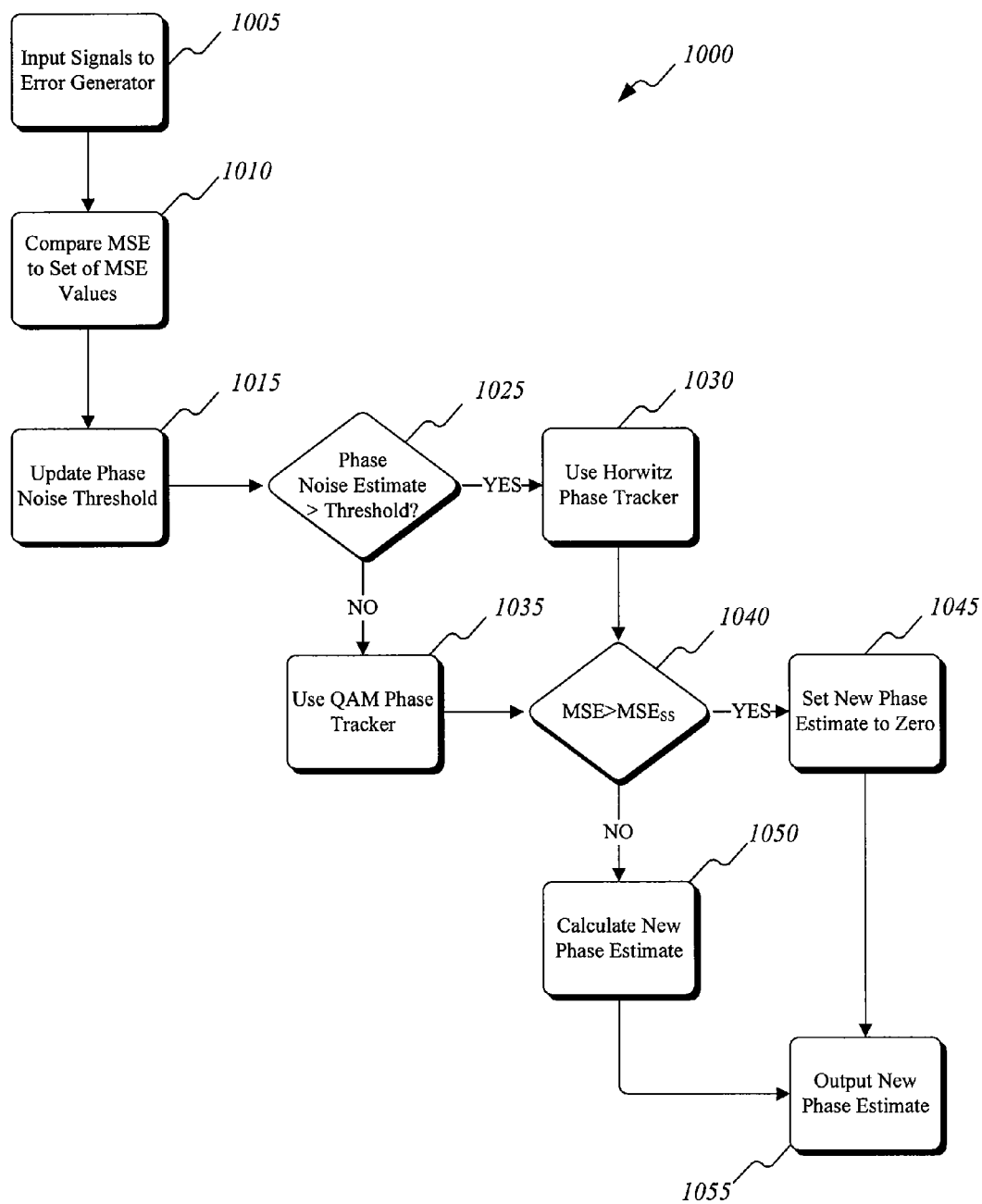
FIG. 18 illustrates a process for generating a phase estimate.

FIG. 18 illustrates a process 1000 for generating a phase estimate. A plurality of signals is input into the error generator (step 1005). The input signals include the real and imaginary parts of the complex de-rotated received signal, a plurality of symbol decisions based on the real part of the complex de-rotated received signal, the estimated imaginary component of the transmitted signal, the phase tracker MSE from a previous iteration of a phase tracking loop, and a current phase estimate. The MSE is compared to a set of MSE values (step 1010). A phase noise threshold value is updated based on the MSE (step 1015). The phase estimate is compared to the phase noise threshold value (step 1025) to determine which phase tracker to use. If the phase estimate is greater than the phase noise threshold value, the Horwitz phase tracker is selected (step 1030). If the phase estimate is not greater than the phase noise threshold value, the QAM phase tracker is used (step 1035). After a phase tracker has been selected, the phase estimate is updated. To update the phase estimate, the previous phase tracker MSE is compared to a steady state MSE (step 1040). If a field sync segment is equal to 1 and the previous MSE is greater than the steady state MSE, the new phase estimate is set to zero (step 1045). Otherwise, the phase estimate is updated using a simple integrator with parameter, γ (step 1050). The new phase estimate is then output (step 1055) and used during the next iteration of the phase tracking loop.

Figure 19:
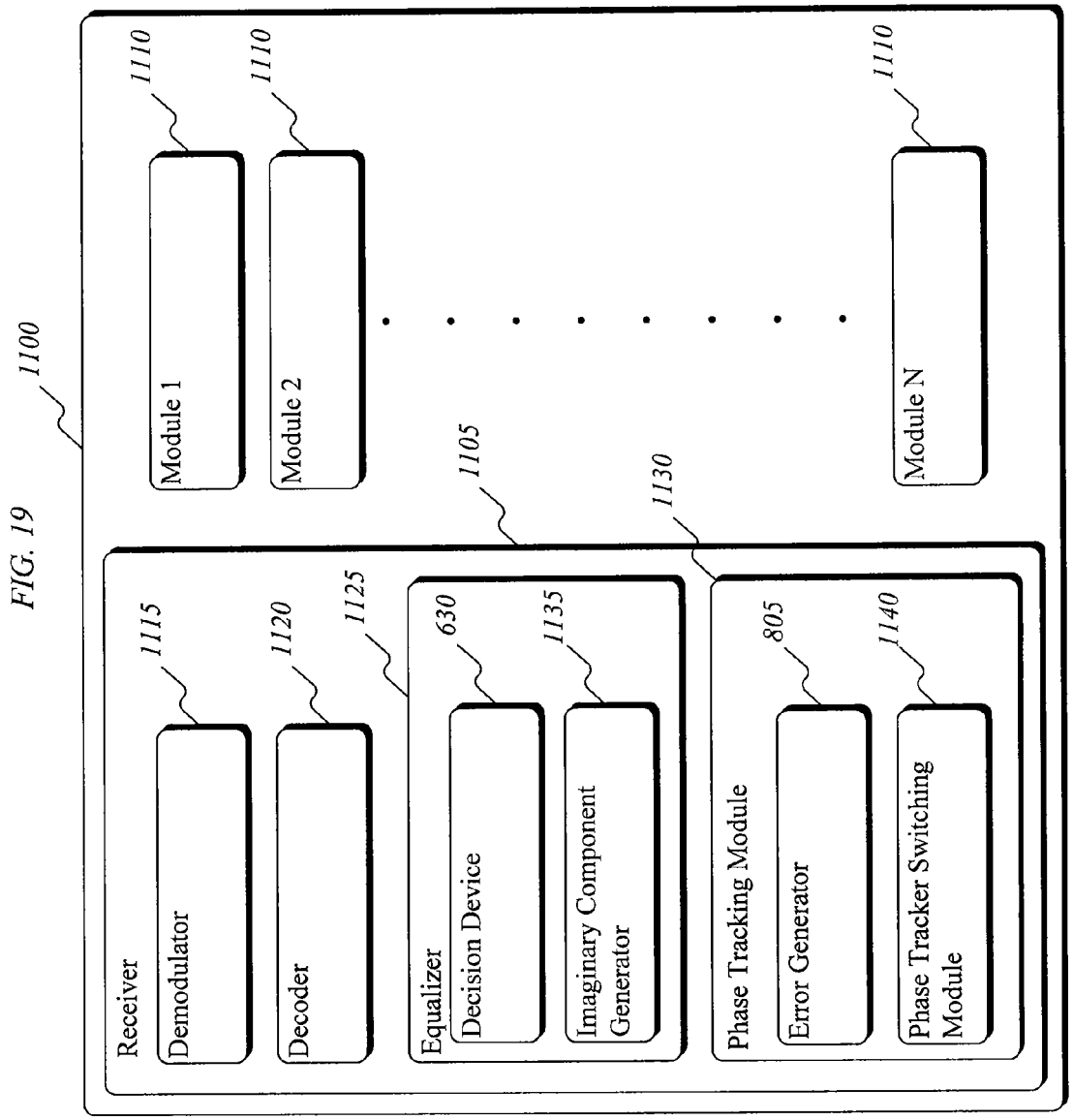
FIG. 19 illustrates a device for implementing the phase tracker of FIG. 10.

FIG. 19 illustrates a digital communications device 1100 according to an embodiment of the invention. The device 1100 is operable to implement the phase tracking loop 800 shown in FIG. 9. The device 1100 is implemented partially or entirely on a semiconductor (e.g., FPGA semiconductor) chip, such as a chip developed through a register transfer level ("RTL") design process. The illustrated device 1100 includes a receiver module 1105 and optional hardware, and/or software module(s) 1110 that provide additional functions (e.g., display functions). In other embodiments, the device 1100 includes more or fewer modules. For example, certain depicted modules are implemented on other devices that interface with the device 1100 (e.g., the receiver module 1105 interfaces with a display module incorporated into a separate device).

The receiver module 1105 includes a demodulator 1115, a decoder 1120, an equalizer 1125, and a phase tracking module 1130. In some embodiments, the receiver module 1105 includes one or more additional modules, such as, for example, a tuner, a sync and timing recovery module, a matched filter, a phase tracker, a deinterleaver, a second decoder, a slicer, and/or a derandomizer. The equalizer 1125 includes, among other things, the decision device 630C and an imaginary component generator 1135. As described above, the decision device 630C generates a plurality of symbol decisions related to a transmitted signal, and provides the symbol decisions to the error generator 805 in the phase tracking module 1130. The imaginary component generator 1135 generates the imaginary component of a transmitted signal, as described above with respect to FIGS. 8 and 9.

The phase tracking module 1130 includes the error generator 805 and a phase tracker switching module 1140. The phase tracker switching module 1140 switches the operation of the phase tracking module 1130 to the Horwitz from the QAM technique if the previous phase estimate is greater than the phase tracking threshold value, $\theta_s$. Additionally, the phase tracker switching module 1140 switches from the Horwitz to the QAM technique if the previous phase estimate is less than or crosses the phase tracking threshold value, $\theta_s$. In some embodiments, the phase tracking switching module 1140 switches between three or more phase tracking techniques.

Figure 20:
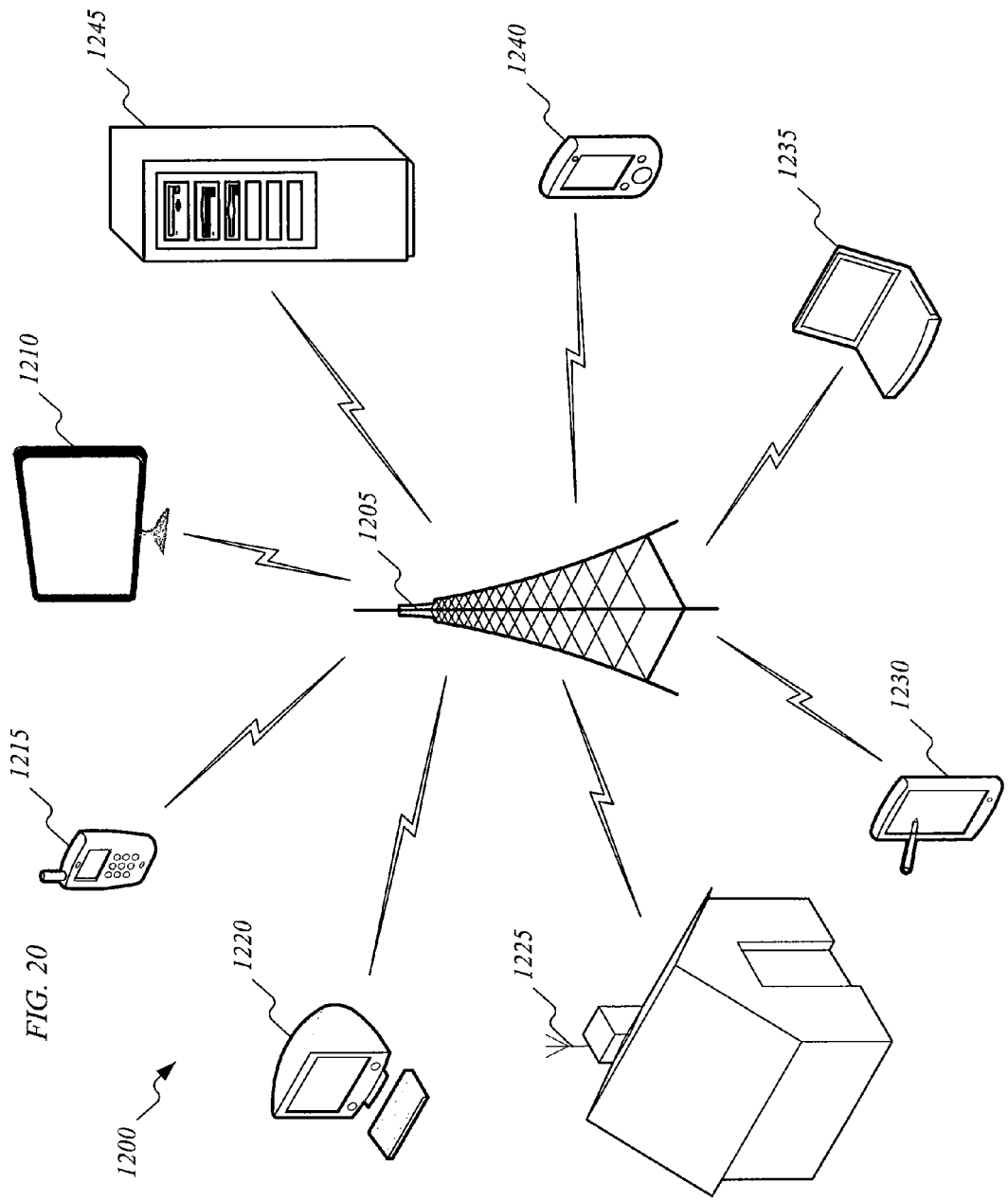
FIG. 20 illustrates a communications system that includes one or more of the devices of FIG. 19.

The device 1100 is implemented as any of a variety of devices which receive radio frequency signals from a transmitter 1205, such as those illustrated in the communications system 1200 of FIG. 20. For example, the device 1100 is incorporated into a television 1210, a smart phone 1215, a personal computer ("PC") 1220 (or a PC adapter card), one or more household antennas 1225, a tablet PC 1230, a laptop computer 1235, a personal digital assistant ("PDA") 1240, or a server 1245. Additionally or alternatively, the device 1100 is incorporated into a receiver (e.g., digital communication receiver), a tuner, a set top box, a DVD recorder, an HDTV recorder, or the like, which are connected to one or more of the devices 1210-1245 illustrated in FIG. 20.

Although the invention is described with respect to the processing (e.g., reception) of digital television signals, the invention may be implemented in connection with other kinds of digital signals. Similarly, although embodiments of the invention are described with respect to the 8VSB RF modulation format, the invention may be implemented in connection with other modulation formats, such as formats that include coded information and a priori known information.

Thus, the invention provides, among other things, a system and method for tracking phase in a receiver which selectively uses multiple phase trackers. A first phase tracker determines an imaginary component of a transmitted signal in order to generate a phase estimate. The receiver switches between the first phase tracker and a second phase tracker when the phase estimate crosses a phase tracking threshold value. Various features and advantages of the invention are set forth in the following claims.

What is claimed is:

1. A method of tracking phase in a digital receiver, the receiver configured to receive radio frequency signals modulated with data including coded symbols and uncoded symbols, the method comprising:
    demodulating, in a demodulator, the received radio frequency signals to produce the coded symbols and the uncoded symbols;
    decoding, in a decoder, the coded symbols to produce corresponding decoded symbols;
    generating a plurality of symbol decisions related to the received radio frequency signals;
    determining a phase tracking threshold value;
    estimating an imaginary component of a transmitted signal based on the plurality of symbol decisions;
    selecting, in a phase tracking module, one of a first phase tracking technique and a second phase tracking technique,
    wherein the first phase tracking technique is selected when an absolute value of a phase estimate is greater than the phase tracking threshold value, and the second phase tracking technique is selected when the absolute value of the phase estimate is less than the phase tracking threshold value; and
    tracking phase using the selected phase tracking technique.

2. The method of claim 1, wherein the second phase tracking technique is a quadrature amplitude modulation phase tracking technique.

3. The method of claim 1, further comprising receiving, at an error generator, the calculated mean square error, the estimated imaginary component of the transmitted signal, the plurality of symbol decisions, a complex de-rotated received signal, and the phase estimate.

4. The method of claim 1, wherein the decoder is a Viterbi decoder.

5. The method of claim 1, wherein the second phase tracking technique is a decision-directed phase tracking technique.

6. The method of claim 1, wherein the imaginary component of the transmitted signal is dependent upon a real component of the transmitted signal.

7. The method of claim 1, wherein the imaginary component of the transmitted signal has a mean value of zero.

8. The method of claim 1, wherein the radio frequency signals are 8-level-vestigial-sideband ("8VSB") modulated signals.

9. The method of claim 1, wherein the first phase tracking technique is a Horwitz phase tracking technique.

10. A method of tracking phase in a digital receiver, the receiver configured to receive radio frequency signals modulated with data including coded symbols and uncoded symbols, the method comprising:
    demodulating, in a demodulator, the received radio frequency signals to produce the coded symbols and the uncoded symbols;
    generating a plurality of symbol decisions related to the received radio frequency signals;
    determining a phase tracking threshold value;
    estimating an imaginary component of a transmitted signal based on the plurality of symbol decisions; and
    switching, in a phase tracking module, from a first phase tracking technique to a second phase tracking technique when an absolute value of a phase estimate crosses the phase tracking threshold value.

11. The method of claim 10, wherein the first phase tracking technique is used when the absolute value of the phase estimate is greater than the phase tracking threshold value, and the second phase tracking technique is used when the absolute value of the phase estimate is less than the phase tracking threshold value.

12. The method of claim 10, wherein the second phase tracking technique is a quadrature amplitude modulation phase tracking technique.

13. The method of claim 10, wherein the coded symbols are decoded using a Viterbi decoder.

14. The method of claim 10, wherein the second phase tracking technique is a decision directed phase tracking technique.

15. The method of claim 10, wherein the imaginary component of the transmitted signal is dependent upon a real component of the transmitted signal.

16. The method of claim 10, wherein the imaginary component of the transmitted signal has a mean value of zero.

17. The method of claim 10, wherein the radio frequency signals are 8-level-vestigial-sideband ("8VSB") modulated signals.

18. The method of claim 10, wherein the first phase tracking technique is a Horwitz phase tracking technique.

19. A system for tracking phase, the system configured to receive radio frequency signals modulated with data including coded symbols and uncoded symbols, the system comprising:
   a demodulator configured to demodulate the received radio frequency signals to produce the coded symbols and the uncoded symbols;
   a decoder configured to decode the coded symbols to produce corresponding decoded symbols; and
   a phase tracking module configured to
      receive a plurality of symbol decisions related to the received radio frequency signals,
      determine a phase tracking threshold value,
      receive an estimated imaginary component of a transmitted signal based on the plurality of symbol decisions, and
      select one of a first phase tracking technique and a second phase tracking technique,
      wherein the first phase tracking technique is selected when an absolute value of the phase estimate is greater than the phase tracking threshold value, and the second phase tracking technique is selected when the absolute value of the phase estimate is less than the phase tracking threshold value.

20. The system of claim 19, wherein the estimated imaginary component of the transmitted signal has a mean value of zero.

21. The system of claim 19, wherein the estimated imaginary component of the transmitted signal is dependent upon a real component of the transmitted signal.

22. The system of claim 19, wherein the decoder is a Viterbi decoder.

23. The system of claim 19, wherein the phase tracking module includes an error generator configured to receive the mean square error, the estimated imaginary component of the transmitted signal, the plurality of symbol decisions, a complex de-rotated received signal, and the phase estimate.

24. The system of claim 19, wherein the radio frequency signals are 8-level-vestigial-sideband ("8VSB") modulated signals.

25. The system of claim 19, wherein the first phase tracking technique is a Horwitz phase tracking technique.

26. A device configured to process digital television signals, the device comprising:
   a receiver including a demodulator, a decoder, an equalizer, and a phase tracker;
   the receiver configured to receive 8-level-vestigial-sideband ("8VSB") signals modulated with data including coded symbols and uncoded symbols,
   the demodulator configured to demodulate the 8VSB signals to produce the coded symbols and the uncoded symbols;
   the decoder configured to decode the coded symbols to produce corresponding decoded symbols; and
   the phase tracker configured to
      receive a plurality of symbol decisions related to the received radio frequency signals,
      determine a phase tracking threshold value,
      receive an estimated imaginary component of a transmitted signal based on the plurality of symbol decisions, and
      select one of a first phase tracking technique and a second phase tracking technique,
      wherein the first phase tracking technique is selected when an absolute value of a phase estimate is greater than the phase tracking threshold value, and the second phase tracking technique is selected when the absolute value of the phase estimate is less than the phase tracking threshold value.

27. The device of claim 26, wherein the device is a tuner, a television, a PC adapter card, a set top box, a DVD recorder, a HDTV recorder, a phone, or a handheld device.

28. A method of tracking phase in a digital receiver configured to receive 8-level-vestigial-sideband ("8VSB") signals modulated with data including coded symbols and uncoded symbols, the method comprising:
   demodulating, in a demodulator, the received 8VSB signals to produce the coded symbols and the uncoded symbols;
   decoding, in a decoder, the coded symbols to produce corresponding decoded symbols;
   generating a plurality of symbol decisions related to the received 8VSB signals;
   determining a phase tracking threshold value;
   estimating an imaginary component of a transmitted signal based on the plurality of symbol decisions;
   selecting, in a phase tracking module, one of a first phase tracking technique and a second phase tracking technique,
   wherein the first phase tracking technique is selected when an absolute value of a phase estimate is greater than the phase tracking threshold value, and the second phase tracking technique is selected when the absolute value of the phase estimate is less than the phase tracking threshold value; and
   tracking phase using the selected phase tracking technique.

* * * * *